United States Patent
Brown et al.

(10) Patent No.: US 11,934,830 B2
(45) Date of Patent: Mar. 19, 2024

(54) METHOD AND APPARATUS FOR DATA-READY MEMORY OPERATIONS

(71) Applicant: Intel Corporation, Santa Clara, CA (US)

(72) Inventors: William M. Brown, Beaverton, OR (US); Mikhail Plotnikov, Nizhny Novgorod (RU); Christopher J. Hughes, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/839,071

(22) Filed: Jun. 13, 2022

(65) Prior Publication Data

US 2022/0318014 A1  Oct. 6, 2022

Related U.S. Application Data

(63) Continuation of application No. 16/616,390, filed as application No. PCT/US2017/040512 on Jun. 30, 2017, now Pat. No. 11,360,771.

(51) Int. Cl.
G06F 9/30 (2018.01)
G06F 9/38 (2018.01)
G06F 12/0897 (2016.01)

(52) U.S. Cl.
CPC ...... *G06F 9/30047* (2013.01); *G06F 9/30018* (2013.01); *G06F 9/30036* (2013.01);
(Continued)

(58) Field of Classification Search
None
See application file for complete search history.

(56) References Cited

U.S. PATENT DOCUMENTS 7,107,435 B2  9/2006 Brady et al.
8,892,848 B2  11/2014 Sprangle et al.
(Continued)

FOREIGN PATENT DOCUMENTS

CN  104011671 A  8/2014
CN  104025038 A  9/2014
(Continued)

OTHER PUBLICATIONS

'Filtering Superfluous Prefetches using Density Vectors' by Wei-Fen Lin et al., 2001 International Conference on Computer Design. (Year: 2001).*

(Continued)

*Primary Examiner* — Steven G Snyder
(74) *Attorney, Agent, or Firm* — NICHOLSON DE VOS WEBSTER & ELLIOTT LLP

(57) ABSTRACT

Disclosed embodiments relate to a new instruction for performing data-ready memory access operations. In one example, a system includes circuits to fetch, decode, and execute an instruction that includes an opcode, at least one memory location identifier identifying at least one data element, a register identifier, a data readiness indicator identifying at least one data access condition, and a data readiness mask, wherein the execution circuit is to, for each data element of the at least one data element, determine whether a memory request for the data element satisfies the at least one data access condition identified by the data readiness indicator, and in response to determining that the memory request for the data element does not satisfy the at least one data access condition: generate a prefetch request for the data element, and set a value in a corresponding data element position of the data readiness mask to indicate that the memory request for the data element does not satisfy the at least one data access condition.

17 Claims, 25 Drawing Sheets

(52) U.S. Cl.
CPC ...... *G06F 9/30043* (2013.01); *G06F 9/30105* (2013.01); *G06F 9/3016* (2013.01); *G06F 9/3824* (2013.01); *G06F 9/3836* (2013.01); *G06F 12/0897* (2013.01)

(56) References Cited

U.S. PATENT DOCUMENTS

| | | | |
|---|---|---|---|
| 8,972,697 | B2 | 3/2015 | Sperber et al. |
| 9,626,333 | B2 | 4/2017 | Sperber et al. |
| 9,753,889 | B2 | 9/2017 | Sperber et al. |
| 10,042,814 | B2 | 8/2018 | Sprangle et al. |
| 10,146,737 | B2 | 12/2018 | Sperber et al. |
| 10,152,451 | B2 | 12/2018 | Sperber et al. |
| 10,387,151 | B2 | 8/2019 | Hall et al. |
| 10,509,726 | B2 | 12/2019 | Gokhale et al. |
| 10,719,316 | B2 | 7/2020 | Ould-Ahmed-Vall et al. |
| 2004/0243789 | A1 | 12/2004 | Brady et al. |
| 2006/0112228 | A1 | 5/2006 | Shen |
| 2010/0268892 | A1 | 10/2010 | Luttrell |
| 2010/0306477 | A1 | 12/2010 | Luttrell |
| 2011/0264863 | A1 | 10/2011 | Sprangle et al. |
| 2012/0144089 | A1 | 6/2012 | Hall et al. |
| 2012/0254591 | A1 | 10/2012 | Hughes et al. |
| 2012/0254592 | A1 | 10/2012 | San Adrian et al. |
| 2013/0042074 | A1 | 2/2013 | Kadambi et al. |
| 2013/0326160 | A1 | 12/2013 | Sperber et al. |
| 2015/0074354 | A1 | 3/2015 | Sprangle et al. |
| 2015/0074373 | A1 | 3/2015 | Sperber et al. |
| 2016/0103785 | A1 | 4/2016 | Sperber et al. |
| 2017/0091103 | A1 | 3/2017 | Smelyanskiy et al. |
| 2017/0177346 | A1 | 6/2017 | Gokhale et al. |
| 2017/0177349 | A1 | 6/2017 | Yount et al. |
| 2017/0177360 | A1 | 6/2017 | Gokhale et al. |
| 2017/0177363 | A1 | 6/2017 | Yount et al. |
| 2017/0192934 | A1 | 7/2017 | Sperber et al. |
| 2017/0351641 | A1 | 12/2017 | Sperber et al. |
| 2018/0067742 | A1 | 3/2018 | Ould-Ahmed-Vall et al. |
| 2018/0176324 | A1 | 6/2018 | Kumar et al. |
| 2018/0189184 | A1 | 7/2018 | Zbiciak |
| 2019/0026173 | A1 | 1/2019 | Stephens |
| 2019/0155603 | A1 | 5/2019 | Villmow et al. |

FOREIGN PATENT DOCUMENTS

| | | | | |
|---|---|---|---|---|
| CN | 104303142 A | | 1/2015 | |
| EP | 0348495 B1 | | 12/1993 | |
| EP | 3391203 B1 | * | 9/2021 | ......... G06F 12/0862 |
| JP | 2014-513340 A | | 5/2014 | |
| JP | 2014-513341 A | | 5/2014 | |
| WO | 89/06397 A2 | | 7/1989 | |
| WO | 2013/180738 A1 | | 12/2013 | |
| WO | 2013/188306 A1 | | 12/2013 | |

OTHER PUBLICATIONS

Advisory Action, U.S. Appl. No. 16/616,390, dated Aug. 4, 2021, 3 pages.

Data Prefetch Mechanisms' by Steven P. VanderWiel etal., first published in 2005. (Year: 2005).

Final Office Action, U.S. Appl. No. 16/616,390, dated Apr. 19, 2021, 17 pages.

International Preliminary Report on Patentability, PCT Appl. No. PCT/US2017/040512, dated Jan. 9, 2020, 8 pages.

International Search Report and Written Opinion for Application No. PCT/US2017/040512, dated Mar. 29, 2018, 8 pages.

Non Final Office Action, U.S. Appl. No. 16/616,390, dated Nov. 9, 2020, 19 pages.

Non-Final Office Action, U.S. Appl. No. 16/616,390, dated Oct. 1, 2021, 17 pages.

Notice of Allowance, U.S. Appl. No. 16/616,390, dated Feb. 25, 2022, 7 pages.

* cited by examiner

Pseudocode for data ready gather instruction "VPRDYGATHER":

zmm2, k2 = VPRDYGATHER base, zmm1, L1_CACHE_ENUM
for i=1:16
    if data_ready(base[zmm1[i]])
        zmm2[i]=base[zmm1[i]]
        k2[i]=UNMASKED
    else
        prefetch(base[zmm1[i]])
        zmm2[i]=UNCHANGED OR ZERO
        k2[i]=MASKED
    endif
endfor

401

Main Memory 402 — contains $e_2$

Element 2 ($e_2$) not in cache, prefetch into L1

L1 Cache 403 contains: $e_{11}$, $e_8$, $e_{12}$, $e_{16}$, $e_{13}$, $e_3$, $e_{15}$, $e_9$, $e_6$, $e_5$, $e_1$, $e_{14}$, $e_4$, $e_{11}$, $e_7$ zmm2 404: $e_1$, ?, $e_3$, $e_4$, $e_5$, $e_6$, $e_7$, $e_8$, $e_9$, $e_{10}$, $e_{11}$, $e_{12}$, $e_{13}$, $e_{14}$, $e_{15}$, $e_{16}$ k2 405: -, X, -, -, -, -, -, -, -, -, -, -, -, -, -, -

```
Pseudocode for data ready vector load instruction "VPRDYLOADU":

zmm2, k2 = VPRDYLOADU base, L1_CACHE_ENUM
for i=1:16
        if data_ready(base[i])
                zmm2[i]=base[i]
                k2[i]=UNMASKED
        else
                prefetch(base[i])
                zmm2[i]=UNCHANGED OR ZERO
                k2[i]=MASKED
        endif
endfor
```

FIG. 6

600 

```
Pseudocode for algorithm using data ready instructions:

k1 = ALL_UNMASKED // data-ready mask
k2 = ALL_UNMASKED // data element mask
n = SIMD_WIDTH
repeat
    if num_elements_left () < n
            // Mask some lanes because there are not enough data elements left
            k2 = mask_last_n_lanes(n – num_elements_left(), k1)
            n = num_elements_left()
    else
            k2 = join masks(k1, k2);
    endif
    // -keep any indices from last iteration that were not ready
    // -load n new indices into v0
    // -adjust remaining element count/pointer to new elements
    v0 = get_n_next_data_element_indices(n, k2, v0)
    // Copy k2 to k1, which is both input & output for gather
    k1 = k2
    // load data elements that are ready and update k1
    zmm2, k1 = VPRDYGATHER base, v0, READY_INDICATOR, k1
    // In some embodiments, a separate k3 mask is unnecessary and two or
    // fewer vector masks can be used
    k3 = join_masks(k1,k2)
    n = count_unmasked_lanes(k3)
    perform_computation(zmm2,k3)
until k2 equals all_ready(k1,k2) and num_elements_left() equals 0
```

700                    FIG. 7

Pseudocode for algorithm using data ready instructions:

k1 = ALL_UNMASKED // data element mask
n = SIMD_WIDTH
repeat
    if num_elements_left() < n
        n = num_elements_left()
        // Mask some lanes because there are not enough data elements left
        k1 = mask_last_n_lanes(SIMD_WIDTH – n)
    endif
    v0 = get_n_next_data_element_indices(n)
    // Copy k1 to k2, which is both input & output for gather
    k2 = k1
    zmm2,k2 = VPRDYGATHER base, v0, READY_INDICATOR, k2
    // store indices for elements that are not ready in buffer
    append_to_retry_buffer(v0, invert_masks(k2), k1)
    // perform the computation only for unmasked lanes in k2
    k3 = join_masks(k1, k2)
    perform_computation(zmm2, k3)
until num_elements_left() equals 0 k1 = ALL_UNMASKED
n = SIMD_WIDTH
repeat
    if num_retry_left() < n
        n = num_retry_left()
        k1 = mask_last_n_lanes(SIMD_WIDTH – n)
    endif
    v0 = dequeue_n_retry_element_indices(n)
    // load data elements without data-ready qualification
    zmm2 = VPGATHER base, v0, k1
    perform_computation(zmm2, k1)
until num_retry_left() equals 0

Pseudocode for algorithm using data ready instructions:

k1 = ALL_UNMASKED // data element mask
n = SIMD_WIDTH
// Optionally, don't retry memory ops every loop, but use counter that can be
// incremented by different values depending on loop conditions (to ignore,
// increment values can be 0 as can the trip value for retry_count)
retry_count = 0
repeat
    if num_elements_left() > 0
        if num_elements_left < n
            n = num_elements_left()
            // Mask some lanes because there are not enough
            // data elements left
            k1 = mask_last_n_lanes(SIMD_WIDTH – n)
        endif
        v0 = get_n_next_data_indices(n)
        // Copy k1 to k2, which is both input & output for gather
        k2 = k1
        zmm2,k2 = VPRDYGATHER base, v0, READY_INDICATOR, k2
        // store indices that are ready in ready buffer
        append_to_ready_buffer(zmm2, join_masks(k2,k1))
        // store indices for elements that are not ready in buffer
        append_to_retry_buffer(v0, invert_masks(k2), k1)
        retry_count = retry_count + DATA_RETRY_INCREMENT
    endif
    // If we have enough elements in ready buffer, do computation
    if num_ready_elements() >= SIMD_WIDTH
        zmm2 = dequeue_n_ready_elements(SIMD_WIDTH)
        perform_computation(zmm2)
        retry_count = retry_count + COMPUTE_RETRY_INCREMENT
    endif
    retry_count = retry_count + LOOP_RETRY_INCREMENT
    // - If we have enough elements in retry buffer and an optional retry interval
    //   has passed, try memory op again
    // - Other combinations of conditions for retry might be used (e.g., always retry
    //   when there is no other work in loop, only reset retry_count on a miss, etc.)

```
    (continued from Figure 8A)

if num_retry_elements() >= SIMD_WIDTH and
              retry_count > RETRY_INTERVAL
        retry_count = 0
        v0 = dequeue_n_retry_indices(SIMD_WIDTH)
        // Data ready memory op to update buffers
        // -- Optionally, could use standard memory op to force wait for data with
        // no need to enqueue retry buffer
        zmm2, k2 = VPRDYGATHER base, v0, READY_INDICATOR
        append_to_ready_buffer (zmm2, k2)
        append_to_retry_buffer(v0, invert_masks(k2))
    endif
until num_elements_left() equals 0 and
    num_ready_elements () < SIMD_WIDTH and
    num_retry_elements() < SIMD_WIDTH // Process any remaining elements
if num_ready_elements() > 0
    k1 = mask_last_n_lanes(SIMD_WIDTH – num_ready_elements())
    v0 = dequeue_n_retry_indices(num_retry_elements())
    zmm2 = VPGATHER base, v0, k1
    perform_computation(zmm2, k1)
endif
```

900A 

FIG. 9A

```
Pseudocode for algorithm using data ready instructions:

k1 = ALL_UNMASKED // data element mask
retry_count = 0
repeat
    if num_elements_left() > 0
        if num_elements_left > SIMD_WIDTH
            //-Get next address for load (can be simple counter add)
            //-Decrease elements left by SIMD_WIDTH until 0
            base = get_next_address()
            zmm2,k2 = VPRDYLOADU base, READY_INDICATOR
            // Store in retry buffer if any indices missed
            if count_masked_lanes(k2) > 0
                append_to_retry_buffer(base)
            else
                perform_computation(zmm2)
                retry_count = retry_count +
                    COMPUTE_RETRY_INCREMENT
            endif
        else
            k1 = mask_last_n_lanes(SIMD_WIDTH – num_elements_left())
            base = get_next_address()
            zmm2 = VPLOADU base, k1
            perform_computation(zmm2,k1)
        endif
        retry_count = retry_count + DATA_RETRY_INCREMENT
    endif
    retry_count = retry_count + LOOP_RETRY_INCREMENT
    // If we have elements in retry buffer and an optional retry interval has passed,
    // try memory op again
    // - Other combinations of conditions for retry might be used (e.g., always retry
    // when there is no other work in loop, only reset retry_count on a miss, etc.)
    if num_retry_elements() > 0 and retry_count > RETRY_INTERVAL
        base = dequeue_retry_address()
        // Data ready memory op to retry memory op
        // -- Optionally, could use standard memory op to force wait
        //       for data and compute (continued at Figure 9B)
```

```
(continued from Figure 9A)

zmm2, k2 = VPRDYLOADU base, READY_INDICATOR
        if count_masked_lanes(k2) > 0
                append_to_retry_buffer(base)
        else
                retry_count = 0
                perform_computation(zmm2)
        endif
    endif
until num_elements_left() equals 0 and
    num_retry_elements() equals 0
```

FIG. 10

1000 

```
Pseudocode for algorithm using data ready instructions:

retry_count = 0
repeat
    if num_elements_left() > 0
            // - Get next address for load (can be simple counter add)
            // - Decrease elements left by SIMD_WIDTH until 0
            base = get_next_address()
            r2,k2 = SRDYLOAD base, READY_INDICATOR
            if masked(k2) equals TRUE
                    append_to_retry_buffer(base)
            else
                    perform_computation(r2)
                    retry_count = retry_count + COMPUTE_RETRY_INCREMENT endif
            retry_count = retry_count + DATA_RETRY_INCREMENT
    endif
    retry_count = retry_count + LOOP_RETRY_INCREMENT
    if num_retry_elements() > 0 and retry_count > RETRY_INTERVAL
            base = dequeue_retry_address()
            // Data ready memory op to retry memory op
            // -- Optionally, could use standard memory op to force wait for data
            //      and compute and not adjust buffers
            r,k2 = SRDYLOAD base, READY_INDICATOR
            if masked(k2) equals TRUE
                    append_to_retry_buffer(base)
            else
                    retry_count = 0
                    perform_computation(r)
            endif
    endif
until num_elements_left() equals 0 and
    num_retry_elements() equals 0
```

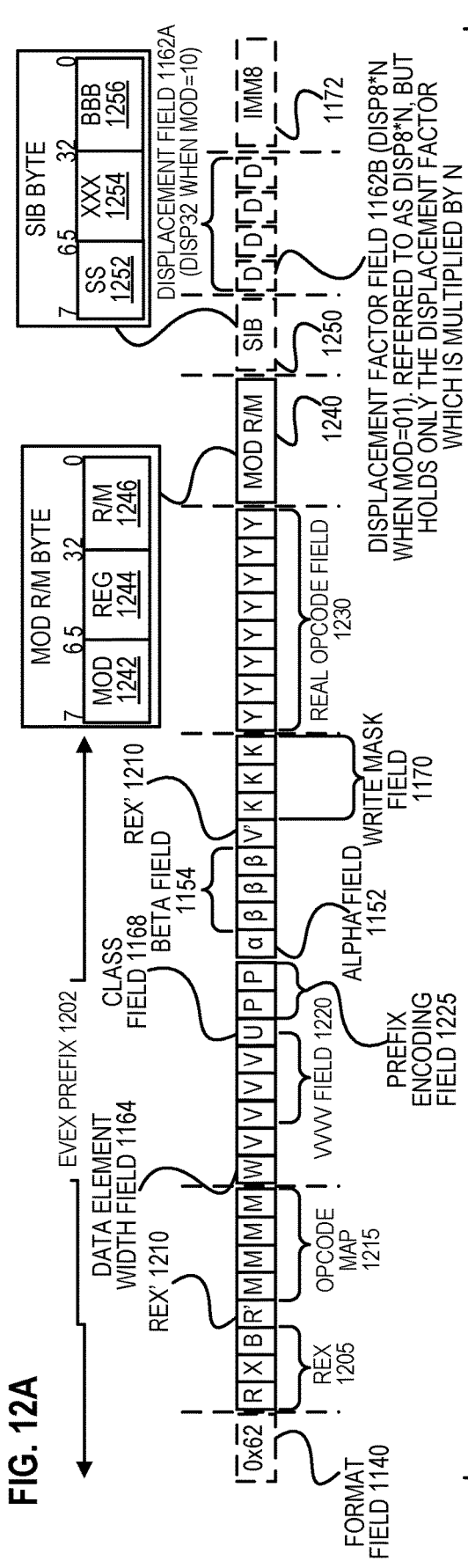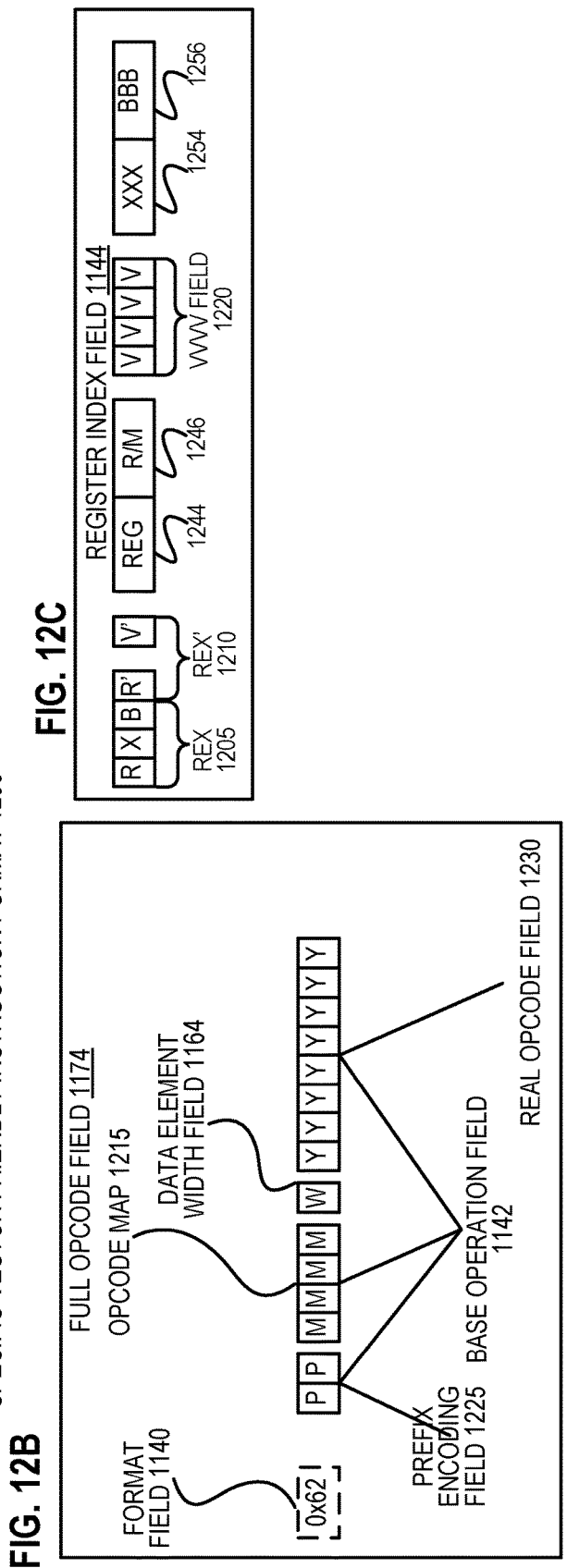

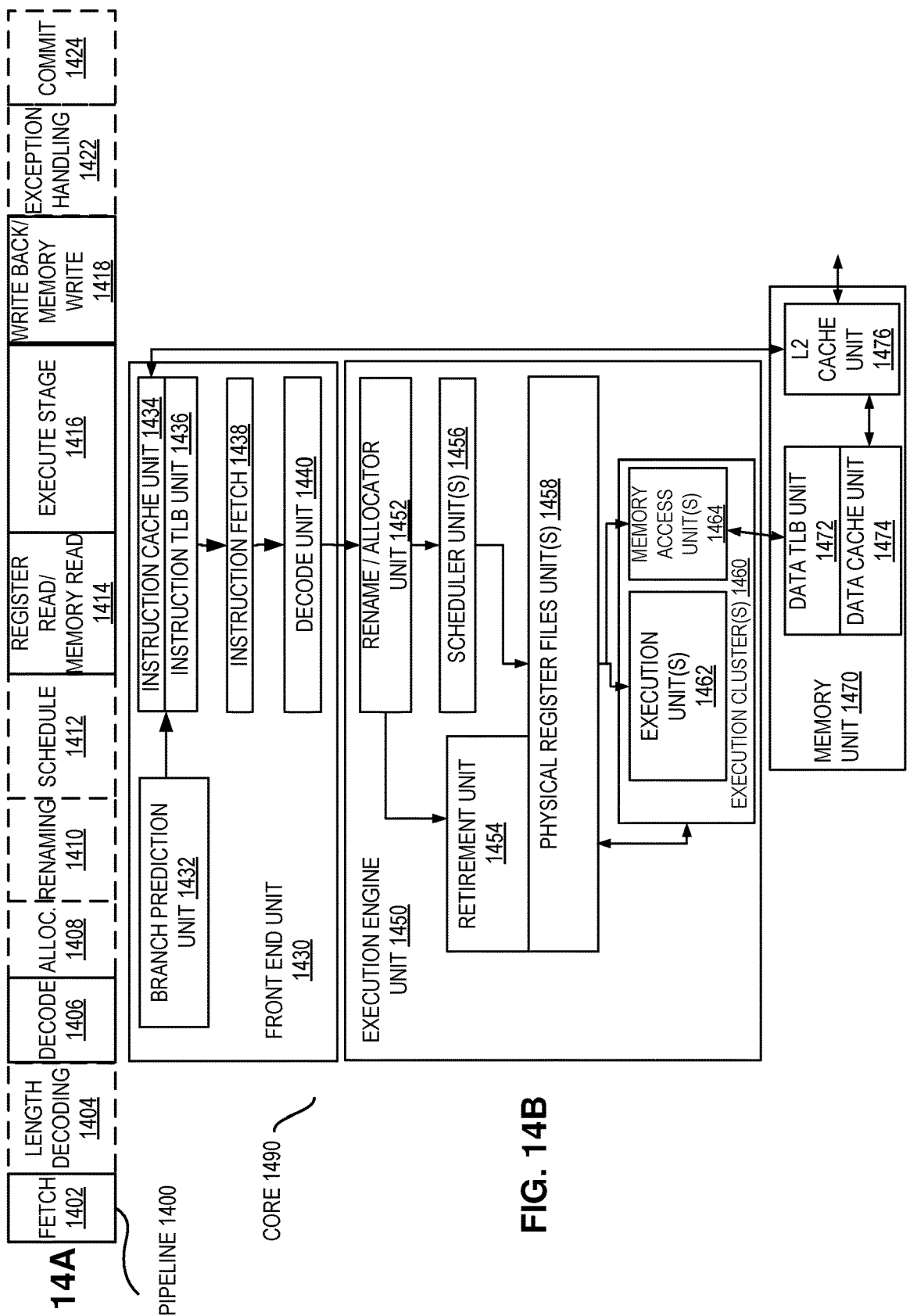

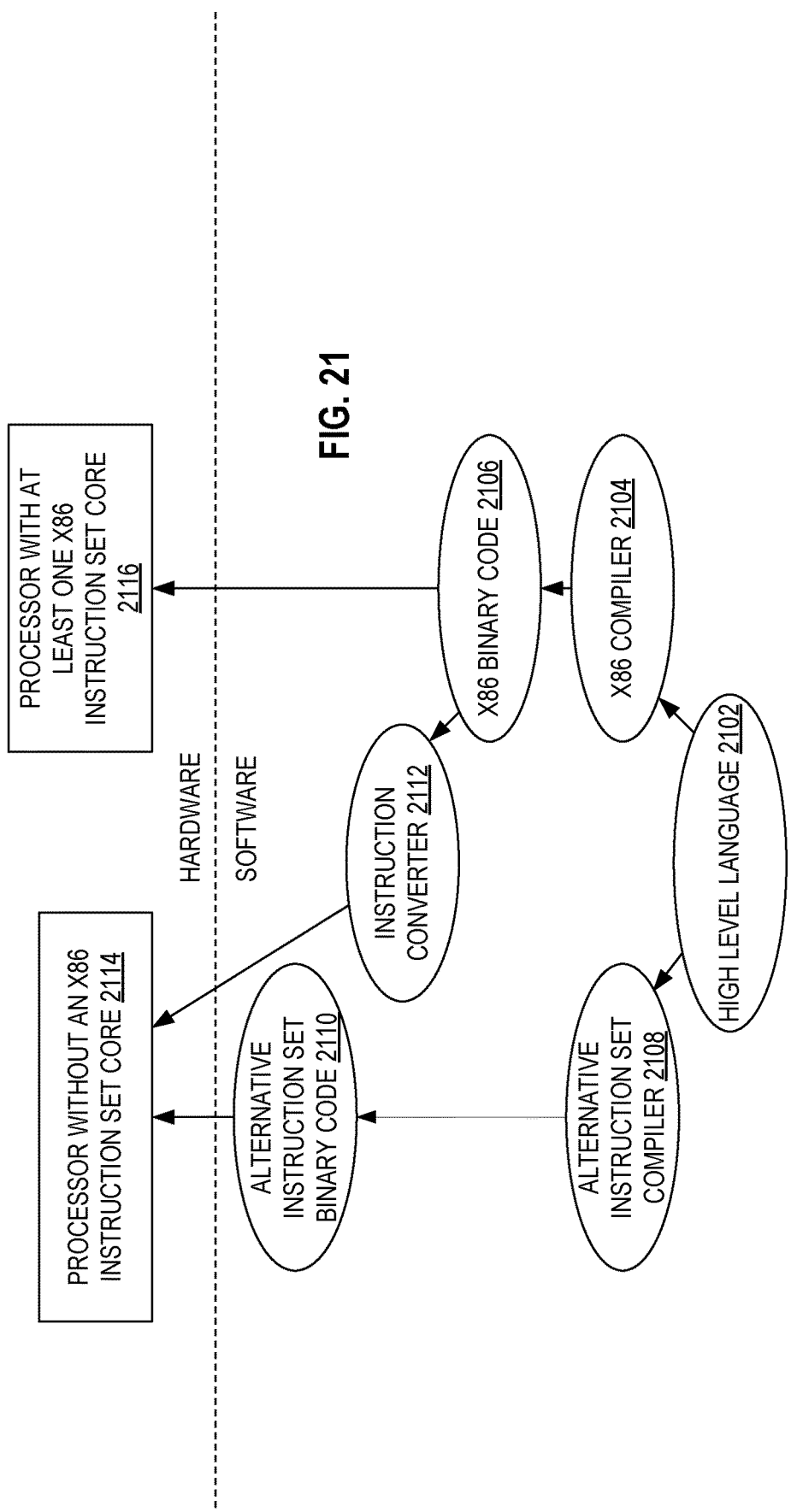

METHOD AND APPARATUS FOR DATA-READY MEMORY OPERATIONS

FIELD OF INVENTION

The field of invention relates generally to computer processor architecture. More specifically, the field of the invention relates to instructions for performing data-ready memory access operations.

BACKGROUND

An instruction set, or instruction set architecture (ISA), is the part of the computer architecture related to programming, including the native data types, instructions, register architecture, addressing modes, memory architecture, interrupt and exception handling, and external input and output (I/O). It should be noted that the term "instruction" generally refers herein to macro-instructions—that is, instructions that are provided to the processor for execution—as opposed to micro-instructions or micro-ops—that is, the result of a processor's decoder decoding macro-instructions. The micro-instructions or micro-ops can be configured to instruct an execution unit on the processor to perform operations to implement the logic associated with the macro-instruction.

The ISA is distinguished from the microarchitecture, which is the set of processor design techniques used to implement the instruction set. Processors with different microarchitectures can share a common instruction set. For example, Intel® Pentium 4 processors, Intel® Core™ processors, and processors from Advanced Micro Devices, Inc. of Sunnyvale, California implement nearly identical versions of the x86 instruction set (with some extensions that have been added with newer versions), but have different internal designs. For example, the same register architecture of the ISA may be implemented in different ways in different microarchitectures using well-known techniques, including dedicated physical registers, one or more dynamically allocated physical registers using a register renaming mechanism (e.g., the use of a Register Alias Table (RAT), a Reorder Buffer (ROB) and a retirement register file). Unless otherwise specified, the phrases register architecture, register file, and register are used herein to refer to that which is visible to the software/programmer and the manner in which instructions specify registers. Where a distinction is required, the adjective "logical," "architectural," or "software visible" will be used to indicate registers/files in the register architecture, while different adjectives will be used to designate registers in a given microarchitecture (e.g., physical register, reorder buffer, retirement register, register pool).

An instruction set includes one or more instruction formats. A given instruction format defines various fields (number of bits, location of bits) to specify, among other things, the operation to be performed and the operand(s) on which that operation is to be performed. Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. An instruction is expressed using an instruction format (and, if defined, in an instruction template for that instruction format) and specifies the operation and the operands. An instruction stream is a specific sequence of instructions, where each instruction in the sequence is an occurrence of an instruction in an instruction format (and, if defined, a given one of the instruction templates of that instruction format).

BRIEF DESCRIPTION OF THE DRAWINGS

Embodiments of the present invention are illustrated by way of example and not limitation in the figures of the accompanying drawings, in which like references indicate similar elements and in which:

FIG. 4 is pseudocode and a diagram illustrating execution of a data-ready gather instruction, according to an embodiment;

FIG. 5 is pseudocode illustrating execution of a data-ready vector load instruction, according to some embodiments;

FIG. 6 is pseudocode illustrating an example algorithm for using data-ready memory access instructions, according to an embodiment;

FIG. 7 is pseudocode illustrating another example algorithm for using data-ready memory access instructions, according to an embodiment;

FIGS. 8A-8B are pseudocode illustrating yet another example algorithm for using data-ready memory access instructions, according to an embodiment;

FIGS. 9A-9B are pseudocode illustrating yet another example algorithm for using data-ready memory access instructions, according to an embodiment;

FIG. 10 is pseudocode illustrating yet another example algorithm for using data-ready memory access instructions, according to an embodiment;

FIG. 11A is a block diagram illustrating a generic vector friendly instruction format and class A instruction templates thereof according to embodiments of the invention;

FIG. 11B is a block diagram illustrating the generic vector friendly instruction format and class B instruction templates thereof according to embodiments of the invention;

FIG. 12A is a block diagram illustrating an exemplary specific vector friendly instruction format according to embodiments of the invention;

FIG. 12B is a block diagram illustrating the fields of the specific vector friendly instruction format 1200 that make up the full opcode field 1174 according to one embodiment of the invention;

FIG. 12C is a block diagram illustrating the fields of the specific vector friendly instruction format 1200 that make up the register index field 1144 according to one embodiment of the invention;

FIG. 14A is a block diagram illustrating both an exemplary in-order pipeline and an exemplary register renaming, out-of-order issue/execution pipeline according to embodiments of the invention;

FIG. 14B is a block diagram illustrating both an exemplary embodiment of an in-order architecture core and an exemplary register renaming, out-of-order issue/execution architecture core to be included in a processor according to embodiments of the invention;

FIG. 15A is a block diagram of a single processor core, along with its connection to the on-die interconnect network 1502 and with its local subset of the Level 2 (L2) cache 1504, according to embodiments of the invention;

FIG. 15B is an expanded view of part of the processor core in FIG. 15A according to embodiments of the invention;

FIGS. 17-21 are block diagrams of exemplary computer architectures;

FIG. 17 shown a block diagram of a system in accordance with one embodiment of the present invention;

FIG. 18 is a block diagram of a first more specific exemplary system in accordance with an embodiment of the present invention;

FIG. 19 is a block diagram of a second more specific exemplary system in accordance with an embodiment of the present invention;

FIG. 20 is a block diagram of a System-on-a-Chip (SoC) in accordance with an embodiment of the present invention; and FIG. 21 is a block diagram contrasting the use of a software instruction converter to convert binary instructions in a source instruction set to binary instructions in a target instruction set according to embodiments of the invention.

DETAILED DESCRIPTION

Figure 1:
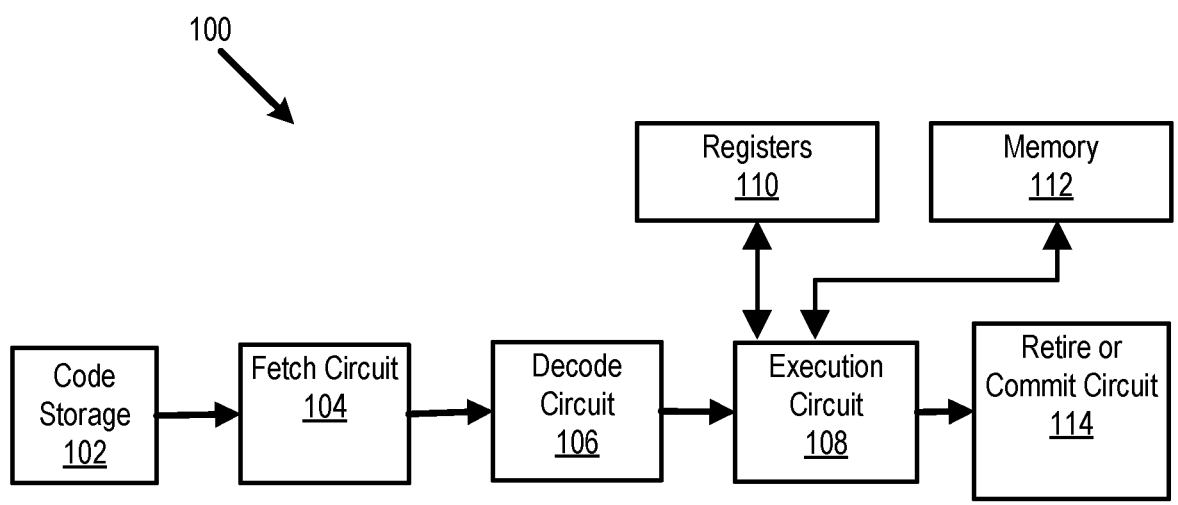
FIG. 1 is a block diagram illustrating processing components for executing data-ready memory access instructions according to some embodiments.

In the following description, numerous specific details are set forth. However, it is understood that embodiments of the invention may be practiced without these specific details. In other instances, well-known circuits, structures and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

A common processing pattern during the execution of computer programs is a loop that iterates over a set of data elements and performs one or more operations on the data elements. In many instances, the operation(s) on an individual data element can be performed independently from the operation(s) on other data elements in the set. In these instances, operations on each data element can be processed concurrently or each data element can be processed iteratively but in an arbitrary order. Some computer architecture techniques, such as vectorization and multi-threading, are designed to more efficiently process sets of data elements based on these properties.

The processing of data elements as described above can be complicated by a phenomenon known as "memory divergence." At a high level, memory divergence refers to situations where separate data elements of a set of data elements are associated with different memory access patterns. The "divergence" arises from the fact that these different memory access patterns can be associated with significantly different access latencies. For example, a loop might operate on a vector of data elements where some of the data elements are present in a data cache and accessed with relatively low latency, while other data elements in the same vector require access to main memory in different non-uniform memory access (NUMA) domains requiring a higher memory access latency, while still other data elements might require additional processing to determine a physical memory location from a virtual address, and so forth.

Various techniques, including types of instruction-level parallelism, can be used to reduce some of the delays caused by high latency memory accesses. However, some memory access patterns can still cause significant execution delays if only instruction-level parallelism is used. These delays are often magnified when the processing involves vectorized loops. For example, any instructions dependent on the successful processing of an entire vector of data elements generally cannot be executed until all data elements in the vector become available and are operated upon. Thus, memory divergence can lead to idle hardware resources even while other computations are available for execution. Simultaneous multithreading (SMT) is another approach that can be used to reduce some of the delays caused by memory divergence-related issues. However, this approach can incur significant parallelization overhead (since data access and synchronization are shared over a larger number of workers) and can require an increase in core resources (registers, instruction caches, out-of-order buffers, gather/scatter and fill buffers, etc.) or the need to partition the resources among workers using the same core.

Disclosed herein are new instructions enabling "data-ready" memory accesses used to improve memory access operations in the situations described above and others. Here, a "data-ready" memory access instruction generally refers to an instruction that can be retired after reading or writing only a subset of data elements operated on by the instruction. Among other benefits, by exposing to software layers the "readiness" of data elements to be operated on by an instruction, algorithms can dynamically process elements of data elements sets in an order that can improve the use of processor resources and reduce total execution time. In some embodiments, types of data-ready memory access instructions can include, but are not limited to, scalar load/store, aligned/unaligned vector load/store, gather and scatter instructions, and instructions for atomic updates to memory.

Also disclosed herein are algorithms for using data-ready instructions to efficiently process sets of data elements. At a high level, these algorithms can use data-ready instructions to process "ready" data elements immediately and to defer the processing of "unready" data elements to a later time. For example, one algorithm might process a data element vector loop by immediately processing vector data elements present within a specified level of cache (for example, present in either the L1 or L2 cache) and by deferring computation of data elements that are associated with cache misses. In this example, the processing hardware can convert the data element accesses resulting in a cache miss into prefetches and can retry accessing the missed data elements at a later time. Other example algorithms for processing data elements using data-ready instructions are provided herein.

Data-Ready Instructions

FIG. 1 is a block diagram of a processor capable of executing data-ready memory access instructions, according to some embodiments. As shown, computing system 100 includes code storage 102, fetch circuit 104, decode circuit 106, execution circuit 108, registers 110, memory 112, and retire or commit circuit 114. An instruction is fetched by fetch circuit 104 from code storage 102, which may comprise a cache memory, an on-chip memory, a memory on the same die as the processor, an instruction register, a general register, or system memory, without limitation. In one embodiment, the instruction has a format similar to that of instruction 200 in FIG. 2. After fetching the instruction from code storage 102, decode circuit 104 decodes the instruction, including by parsing the various fields of the instruction. After decoding the fetched instruction, execution circuit 108 executes the decoded instruction. When executing the instruction, execution circuit 108 may read data from and write data to registers 110 and memory 112. Registers 110 may include a data register, an instruction register, a vector register, a mask register, a general register, an on-chip memory, a memory on the same die as the processor, or a memory in the same package as the processor, without limitation. Memory 112 may include an on-chip memory, a memory on the same die as the processor, a memory in the same package as the processor, a cache memory, or system memory, without limitation. After the instruction has been executed, retire or commit circuit 114 may retire the instruction, ensuring that execution results are written to or have been written to their destinations, and freeing up or releasing resources for later use.

Figure 2:
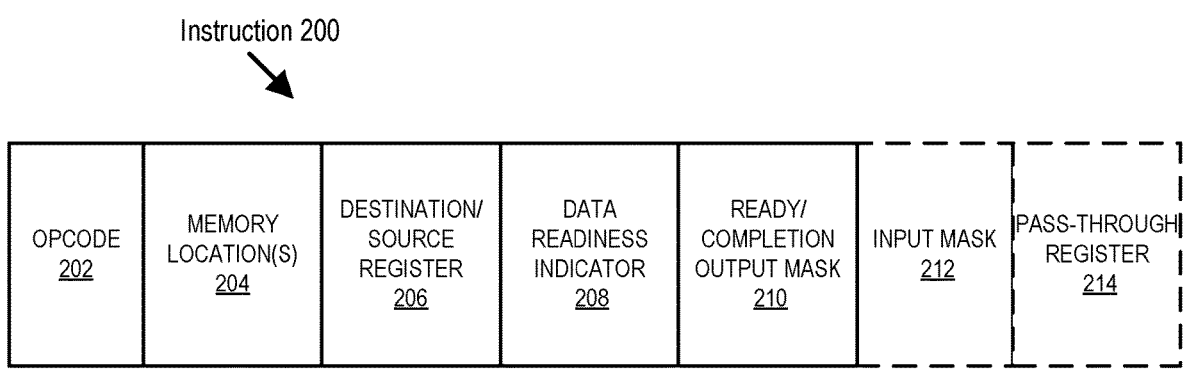
FIG. 2 is a block diagram illustrating a format of a generic data-ready memory access instruction, according to some embodiments.

FIG. 2 is a block diagram illustrating a format of a generic data-ready memory access instruction, according to some embodiments. As shown, a data-ready instruction 200 includes opcode 202, memory location(s) 204, a destination/source register 206, data readiness indicator 208, a ready/completion output mask 210, an optional input mask 212, and an optional pass-through register 214.

In an embodiment, the memory location(s) 204 indicate locations for accessing data element(s) either as part of a read or write operation associated with the instruction 200. In the case of a gather or scatter instruction, for example, a separate memory address can be provided for each data lane to be accessed. In this example, the separate memory addresses can be specified with a base memory address, one or more vector registers containing integer offsets from a base address, and, optionally, a scaling factor for the offsets.

In an embodiment, a destination/source register 206 identifies a register in a register file. For example, destination/source register 206 can be a destination register in the case of a load operation or a source register in the case of a store operation.

In an embodiment, a data readiness indicator 208 can be any type of identifier used to indicate conditions for the "readiness" of data elements associated with the instruction. In general, a data readiness indicator is used to qualify the availability of data elements to be accessed before the associated instruction(s) retire. Based on a data readiness indicator 208, an instruction 200 commits a read or write to a data element identified by memory location(s) 204 only if access to the data element satisfies the condition(s) defined by the readiness indicator.

Examples of memory access conditions that can be identified by a data readiness indicator 208 include, but are not limited to, data elements being present in at least a specified level of a data cache hierarchy (L1 cache, L2 cache, and so forth), data elements being present in a particular non-uniform memory access domain (for example, memory local to processor socket), and data elements being associated with a memory location accessible without generation of a memory access miss that can increase data access latencies. Types of memory access misses that can increase latency include, for example, a translation lookaside buffer (TLB) miss, a page fault, a lock preventing memory access, an unreachable memory address, an access requiring synchronization with another memory domain (an accelerator device, remote direct-memory access, other network access, unified/global virtual addressing, and so forth).

In some embodiments, a data readiness indicator 208 can be included in a data-ready memory access instruction in a number of different ways such as, for example, by embedding the indicator(s) in the instruction opcode 202, including the indicator(s) in the instruction 200 as an immediate value, including the indicator(s) as an operand to the instruction 200 in a general-purpose register, providing the indicator(s) in a machine state register, and including the indicator(s) as part of the page table entry for each data element and separate from the instruction 200.

In some embodiments, a data readiness indicator 208 can comprise multiple data readiness indicators. For example, a bit vector can be used to specify multiple data readiness indicators. If more than one data readiness indicator is specified, the indicator 208 can also indicate whether a data element is considered "ready" when all data readiness conditions are satisfied or when any of the data readiness indicator conditions are satisfied (that is, data readiness can be determined based on either a logical "OR" or a logical "AND" of the data readiness indicators).

In an embodiment, a ready/completion output mask 210 is a bitmask that can be set to identify data elements that satisfy the data readiness indicator 208 and thus are available for relatively low latency access. In some embodiments, the instruction 200 can also optionally include an input mask 212 identifying a subset of the lanes in a vector register(s) to be accessed and optionally a pass-through register 214 containing the values to be used for masked lanes in lieu of a memory access.

Figure 3:
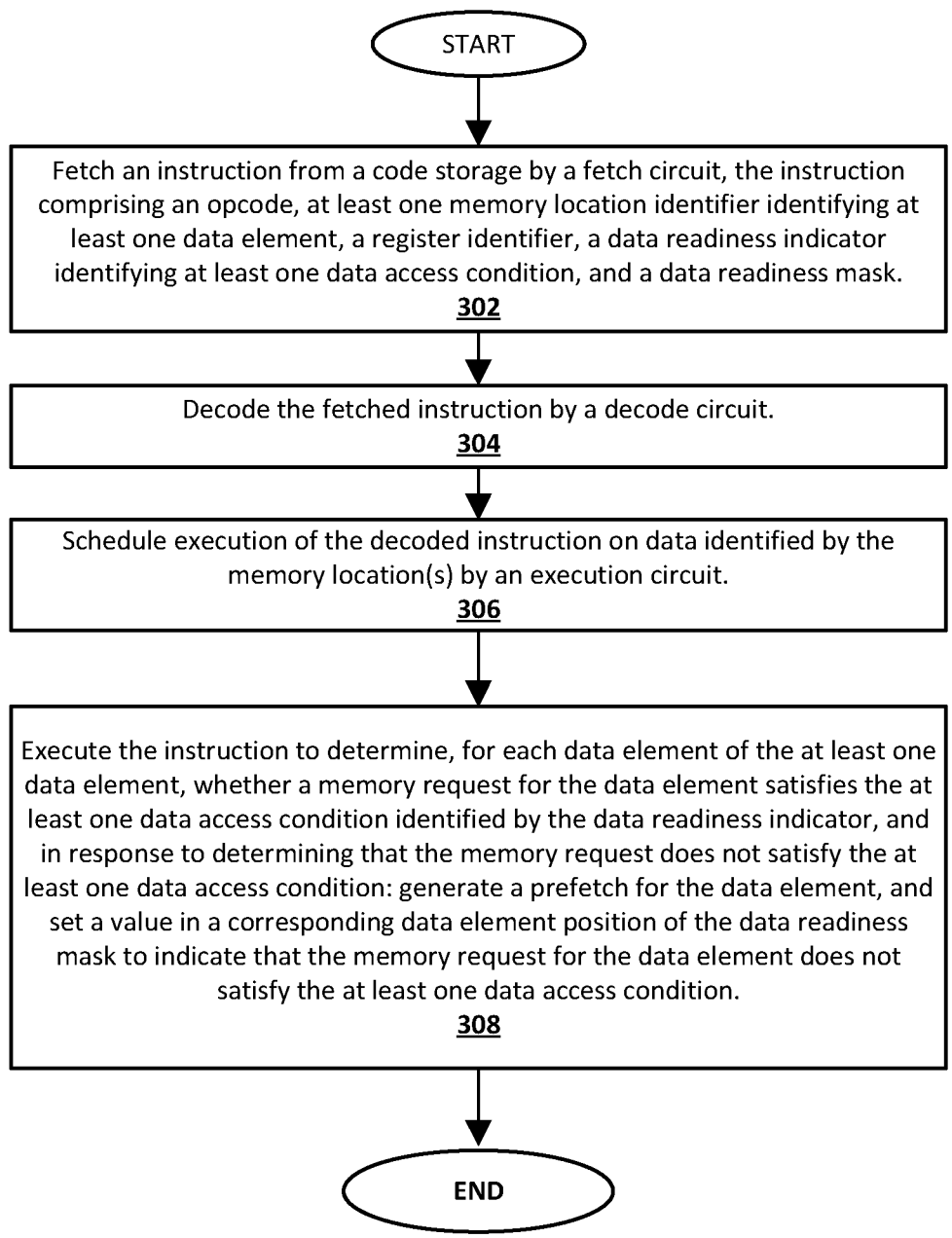
FIG. 3 is a flow diagram of a process to be performed by a processor to execute a data-ready memory access instruction, according to some embodiments.

FIG. 3 is a flow diagram of a process to be performed by a processor to execute a data-ready instruction, according to an embodiment. After starting, the process at 302 fetches an instruction from a code storage by a fetch circuit, the instruction comprising an opcode 202, at least one memory location identifier identifying at least one data element, a register identifier, a data readiness indicator identifying at least one data access condition, and a data readiness mask. At 304, a decode circuit decodes the fetched instruction. At 306, execution of the decoded instruction on data identified by the memory locations(s) by an execution circuit is scheduled.

At 308, the execution circuit determines, for each data element of the at least one data element, whether a memory request for the data element satisfies the at least one data access condition identified by the data readiness indicator, and in response to determining that the memory request does not satisfy the at least one data access condition: generates a prefetch request for the data element, and sets a value in a corresponding data element position of the data readiness mask to indicate that the memory request for the data element does not satisfy the at least one data access condition.

In some embodiments, a process for determining whether a memory request for a data element satisfies a data access condition can depend on a type of data access condition. For example, if a data access condition specifies a level of a memory hierarchy at which data-ready elements are to be present, information about whether a particular data element satisfies the data access condition might be obtained from the memory system. The information obtained from the memory system might be information ordinarily returned for other purposes such as performance monitoring, or the information might be specifically requested from the memory system. Information used by the execution circuit to determine satisfaction of other types of data access conditions similarly might be obtained from the memory system, obtained from any other data source, or determined based on other logic.

In an embodiment, the execution circuit further causes, in response to determining that the memory request for the data element does satisfy the at least one data access condition: retrieving the data element, and storing the data element in a register identified by the register identifier. In an embodiment, the execute circuit further sets a value in a corresponding data element position of the data readiness mask to indicate that the memory request for the data element does satisfy the at least one data access condition.

In an embodiment, the data readiness indicator identifies one or more of: a level in a memory hierarchy at which each data of the at least one data is to be located, a non-uniform memory access domain at which each data element of the at least one data element is to be located, a condition indicating whether access to the data element can be accomplished without generation of a memory access miss.

Example pseudocode 400 for execution of a data-ready memory access instruction is shown in FIG. 4. Here, the data-ready operation is a gather operation with arguments including a base memory address "base," indices in a packed data (SIMD or vector register) "zmm1" indicating memory locations relative to the base memory address "base," a destination vector in "zmm2," a data readiness mask "k2," and a data readiness indicator "L1_CACHE_ENUM." In the example of pseudocode 400, the data readiness indicator specifies a data readiness condition of data elements being present in at least a L1 cache.

The pseudocode 400 determines, for each data element identified by the memory locations (that is, the memory locations identified by base memory address "base" and indices "zmm1"), whether the data element satisfies the data access condition identified by the data readiness indicator "L1_CACHE_ENUM" ("if data_ready(base[zmm1[i]])"). If it is determined that the memory request does satisfy the data access condition, the data element is accessed and stored at the corresponding data element position of destination vector "zmm2" ("zmm2[i]=base[zmm1[i]]") and the corresponding data element position of the data readiness mask "k2" is unmasked ("k2[i]=UNMASKED").

Otherwise, if it is determined that the memory request does not satisfy the data access condition identified by the data readiness indicator, the pseudocode 400 generates a prefetch request for the data element ("prefetch(base[zmm1[i]])"), the corresponding data element position of the destination vector "zmm2" is either unchanged or set to zero, and the corresponding data element position of the data readiness mask "k2" is masked ("k2[i]=MASKED").

FIG. 4 also includes a block diagram 401 illustrating an example execution of a data-ready gather instruction. In the block diagram 401 example shown in FIG. 4, the second data element "$e_2$" is not located in the L1 cache 403 resulting a cache miss. In response to detecting the miss in the L1 cache 403 for the data element "$e_2$," a prefetch from main memory 402 is generated for the data element for storage in the L1 cache 403 and the ready mask "k2" 405 is set to mask the second data lane. The execution of the data-ready gather instruction in FIG. 4 retires without loading an element in the second lane of the destination register "zmm2" 404.

In some embodiments, a ready mask "k2" 405 can be an output mask and may also serve as an input mask (or write-mask) indicating which data elements the data-ready gather instruction should attempt to access. In instances where a ready mask also serves as an input mask, the instruction can either keep input lanes masked (in which case the result is masked for both data that is not ready and data masked in the input mask) or the instruction can mask only those lanes where data is not ready. In some embodiments, an input mask can be provided as an additional operand to the data-ready gather instruction (k1) in order not to be overwritten by output ready mask result (k2).

FIG. 5 illustrates example pseudocode for execution of a data-ready vector load operation. The example pseudocode 500 for the data-ready vector load operation is similar to the pseudocode 400 for the data-ready vector gather operation; however, the data-ready vector load instruction receives as input only a single address "base" and the output mask "k2" is set based on the "readiness" of the cache lines to be accessed to load the requested data.

In some cases, a vector load or vector store operation accesses at most one cache line (e.g., to access an aligned vector or to access a scalar data element) and thus either all of the data elements are ready or none of the data elements are ready for the instruction. However, unlike typical memory access instructions, these data-ready instructions may not guarantee forward progress. For example, it is possible for such data-ready instructions to not access any data elements and to only initiate prefetches for the unready data elements.

Data-Ready Memory Access Algorithms

Also disclosed herein are algorithms for processing data elements using data-ready instructions. As described herein, data-ready instructions can be used to defer processing of data elements that do not satisfy specified data access condition(s) to reduce execution delays. The algorithms described herein use data-ready instructions to attempt accessing identified data elements, to indicate which of the identified data elements satisfy specified data access condition(s) and are therefore "data-ready," to process the data elements identified as data-ready, and to defer the processing of data elements identified as unready. To complete all operations to be performed on a set of data elements identified in a data-ready instruction, deferred data elements can be re-accessed for processing at a later time.

In general, the example data-ready algorithms described herein may complete computations performed on a set of data elements in a non-deterministic order. Thus, the potential benefits of performing operations on sets of data elements in this manner can depend on the data hit rates, data access latencies, a number of cycles required for non-memory access portions of the operations, among other factors.

At a high level, the example algorithms described herein illustrate different ways of handling data elements identified by a data-ready instruction as either data-ready or unready. As an example, one algorithm involving a data-ready memory access instruction might retry accessing deferred data elements immediately after completing computations on other ready data elements. Another example algorithm might create a list of deferred data elements and process the deferred data elements together at a later time. For example, an algorithm might wait a short period to allow deferred elements enough time to be prefetched. Further, once deferred elements are removed from a vector of data elements, the vector of ready data elements may include one or more data element "holes" where the deferred data elements were present. Another example algorithm might perform computations on such data element vectors using masking or by attempting to fill the data element holes with other ready elements.

In one embodiment, an algorithm for performing a computation on a set of data elements comprises using data-ready instructions to perform the entire computation in a single pass over the data elements. In this example, data elements that are identified as unready (that is, data elements that do not satisfy a specified data readiness indicator of a data-ready instruction) result in unused vector lanes and can be retried in a subsequent iteration. For n unready data elements in an iteration of the vector loop on a vector of width W, for example, a subsequent iteration can load W minus n new indices so that indices that were unready are preserved and retried. In the case that n equals W (meaning all data elements of the vector are unready), the loop can continue to retry the data-ready memory operation until at least one data element is ready. This algorithm may not have an effect for memory accesses involving at most one cache line (for example, when accessing a scalar data element or, in some instances, accessing aligned data elements). However, this algorithm can improve applications (for example, software kernels) involving random access with sufficient data locality such that the cache miss rate is relatively low. This is often the case, for example, with molecular dynamics code.

FIG. 6 illustrates an example of an algorithm for performing a computation on a set of data elements, including using a data-ready instruction to perform the computation in a single pass over the data elements, as described above. As shown in pseudocode 600, each of a data-ready mask "k1" and a data element mask "k2" is initialized with all values initially unmasked. A variable "n" is initialized with a value indicating the vector width.

The pseudocode 600 starts by determining whether a total number of data elements remaining to process is less than the value "n" ("if num_elements_left( )<n"). If so, the pseudocode 600 assigns the "k1" mask (possibly carried over from a previous iteration) to "k2" with masks set for the data lanes at the end of the data-ready mask "k1" that are initially unmasked for loading new elements; in this case, there are not enough new data elements to fill the entire vector width of unmasked lanes. Otherwise, in some embodiments, the "k2" mask is computed based on "k2" mask from previous iteration along with any masking of unused lanes stored in "k1" from a previous iteration. In other embodiments, this step is unnecessary, as the k1mask will already have this information from the previous iteration. Next, any indices from the previous iteration that were unready are kept and "n" new indices are loaded into vector "v0" ("v0=get_n_next_data_element indices(n, k2, v0)"). In some embodiments, this load operation can be performed by an EXPAND instruction, which puts new elements from memory or other storage to the lanes of v0vector pointed by the "k2" mask (now identifying lanes with ready elements from previous iteration). Although the pseudocode shows a single loop for processing elements in both the case where "num_elements_left( )"<"n" and "num_elements_left( )">="n", separate loops or code paths for these cases might give better performance and/or allow the majority of the operations to be evaluated with fewer mask vectors.

After all necessary indices are in v0, a data-ready vector gather instruction "VPRDYGATHER" is used to gather data elements based on a data readiness indicator "READY_INDICATOR" ("zmm2, k1=VPRDYGATHER base, v0, READY_INDICATOR, k1"). A computation is performed on the gathered data elements determined to be ready ("perform_computation(zmm2, k3)"). The number of freed up lanes (i.e. ready elements on this iteration) is counted ("n=count_unmasked_lanes(k1,k2)") and is used on the next iteration determining how many new elements ("n") can be loaded. This loop repeats until all data elements in the vector are ready and there are no more data elements left to process ("until k2equals all_ready(k1,k2) and num_elements_left( )equals 0"). In some embodiments, use of a separate "k3" vector mask is unnecessary as the result from the "VPRDYGATHER" instruction already stores masks from both k1and k2.

FIG. 7 illustrates pseudocode for an alternative algorithm that can be used to process a vector loop by processing any data elements that are ready first and subsequently using a second loop using conventional memory accesses to process remaining data elements. Similar to pseudocode 600, pseudocode 700 loads "n" new indices into vector "v0" ("v0=get_n_next_data_element_indices(n)"), in some embodiments this can be as simple as regular vector load or masked vector load. A data-ready vector gather instruction "VPRDYGATHER" is used to gather data elements based on a data readiness indicator "READY_INDICATOR" ("zmm2, k2=VPRDYGATHER base, v0, READY_INDICATOR, k2"). Next, the indices for data elements are not ready are stored in a buffer ("append_to_retry_buffer(v0, invert_masks(k2),k1)"). A computation is performed on the gathered data elements determined to be ready ("perform_computation(zmm2, k3)").

In response to determining that there are no other data elements remaining to process ("until num_elements_left( ) equals 0"), the data elements determined to be unready and stored in the buffer are processed in a second loop. For example, in the second loop of pseudocode 700, "n" indices from the buffer are loaded into vector "v0" ("v0=dequeue_n_retry_element_indices(n)") and a vector gather instruction VPGATHER is used to gather data elements without a data readiness indicator ("zmm2=VPGATHER base, v0, k1". A computation is performed on the data elements gathered by the non-data-ready instruction ("perform_computation(zmm2, k1)"). In this example, by deferring unready data elements to the second loop and accessing the deferred data elements using conventional memory accesses, the algorithm guarantees that at most two attempts are made for each data element.

The examples shown in pseudocode 600 and 700 potentially underutilize computation resources through masking. For example, no attempts are made in pseudocode 600 and 700 to replace data elements that are determined to be unready in the initial loops with other data-ready elements.

In some embodiments, the holes left by unready data elements can be filled by adding a "ready" buffer that is processed when the buffer contains enough elements for a full vector calculation. By processing a retry buffer in the same loop, these embodiments can also improve the efficiency of memory operations other than gather by prefetching data elements that are not yet ready. These embodiments can also improve performance at higher miss rates than might be possible with the previously described embodiments.

FIGS. 8A-8B illustrate pseudocode for an algorithm used to process a set of data elements, the algorithm including replacement of deferred data elements of a vector with other data-ready elements. In pseudocode 800A, "n" new indices are loaded into vector "v0" ("v0=get_n_next_data_element_indices(n)") and a data-ready vector gather instruction "VPRDYGATHER" is used to gather data elements based on a data readiness indicator "READY INDICATOR" ("zmm2, k2=VPRDYGATHER base, v0, READY INDICATOR, k2"). Next, the indices for data-ready elements are stored in a ready buffer ("append_to_ready_buffer(zmm2, join_masks(k2,k1))") and indices for data elements that are determined to be unready are stored in a retry buffer ("append_to_retry_buffer(zmm2, invert_masks(k2,k1))"). Next, when enough data elements to fill the vector are in the ready buffer ("if num_ready_elements( )>=SIMD_WIDTH"), a computation is performed on the gathered data-ready elements ("perform_computation(zmm2)").

In pseudocode 8008 in FIG. 8B, it is determined whether there are enough elements in the retry buffer and, optionally, whether a retry interval has passed ("if num_retry_elements( )>=SIMD_WIDTH and retry_count>RETRY_INTERVAL"). In other embodiments, example conditions for processing the retry buffer containing the initially unready data elements can include processing the retry buffer immediately if any data elements are present, only resetting the retry counter on a miss, or based on any other conditions. If there are enough elements in the retry buffer, a data-ready vector gather instruction "VPRDYGATHER" is again used to gather data elements based on a data readiness indicator "READY INDICATOR" ("zmm2, k2=VPRDYGATHER base, v0, READY INDICATOR, k2") and unready data elements are again stored in the retry buffer. Finally, any remaining elements are processed using a vector gather instruction "VPGATHER" to gather data elements without a data readiness indicator ("zmm2=VPGATHER base, v0, k1").

In some embodiments, the ready and retry buffers can be kept in registers without involving memory accesses. Data-ready memory instructions might also be modified to include arguments for ready and retry buffers to perform the updates as part of the memory instruction. For data-ready vector load operations, the algorithm can be modified as in FIGS. 9A-9B where a ready buffer is not used.

In pseudocode 900A in FIG. 9A, for example, a next base address for a load is stored in the variable "base" and a data-ready load instruction "VPRDYLOADU" is used to load data elements based on readiness indicator "READY INDICATOR" ("zmm2, k2=VPRDYLOADU base, READY_INDICATOR"). Next, if any indices are determined to be unready, the base address is appended to a retry buffer ("append_to_retry_buffer(base)") otherwise a computation is performed on the loaded data elements ("perform_computation(zmm2)"). Next, if there are enough elements in the retry buffer and, optionally, if a retry interval has passed, the memory operation can be performed again ("if num_retry_elements( )>0 and retry_count>RETRY INTERVAL ... zmm2, k2=VPRDYLOADU base, READY INDICATOR"). As shown in pseudocode 9008 in FIG. 9B, if any indices are determined to be unready, the address is appended to the retry buffer and, otherwise, a computation is performed on the loaded data elements.

For scalar operations, the algorithms illustrated above can be further simplified. FIG. 10 illustrates example pseudocode 1000 for using data ready instructions to load scalar values. As shown, a data-ready load instruction "SRDYLOAD" is used to load data elements for processing ("r2, k2=SRDYLOAD base, READY_INDICATOR"). If data elements are determined to be unready by the "SRDYLOAD" instruction, the memory address is appended to the retry buffer, otherwise, a computation is performed on the loaded data elements. Next, if there are any elements to retry and if a retry count has exceeded a retry interval, a data-ready load instruction "SRDYLOAD" is again used to attempt accessing the deferred data elements.

When indexing into multiple arrays for each loop iteration, bitwise operations can be used to combine masks for ready data. However, optimizations to modify the data layout so that all accessed array data for a loop iteration is guaranteed to be on the same cache-line can improve performance for random access (in this case, the data ready memory operation only needs to be performed once). In some embodiments, only a subset of memory operations in the loop (for example, those more likely to miss in cache) can use data-ready operations. In the algorithms presented herein using a "ready buffer" with gather, the ready buffer is shown to store only data elements and not indices. In some embodiments, the indices for data-ready elements may also be stored to allow for multiple memory accesses based on the index within the loop. In other example algorithms, the indices for the data-ready elements may already be available.

Instruction Sets

An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to as the Advanced Vector Extensions (AVX) (AVX1 and AVX2) and using the Vector Extensions (VEX) coding scheme has been released and/or published (e.g., see Intel® 64 and IA-32 Architectures Software Developer's Manual, September 2014; and see Intel® Advanced Vector Extensions Programming Reference, October 2014).

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

Generic Vector Friendly Instruction Format

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations with the vector friendly instruction format.

Figure 11A:
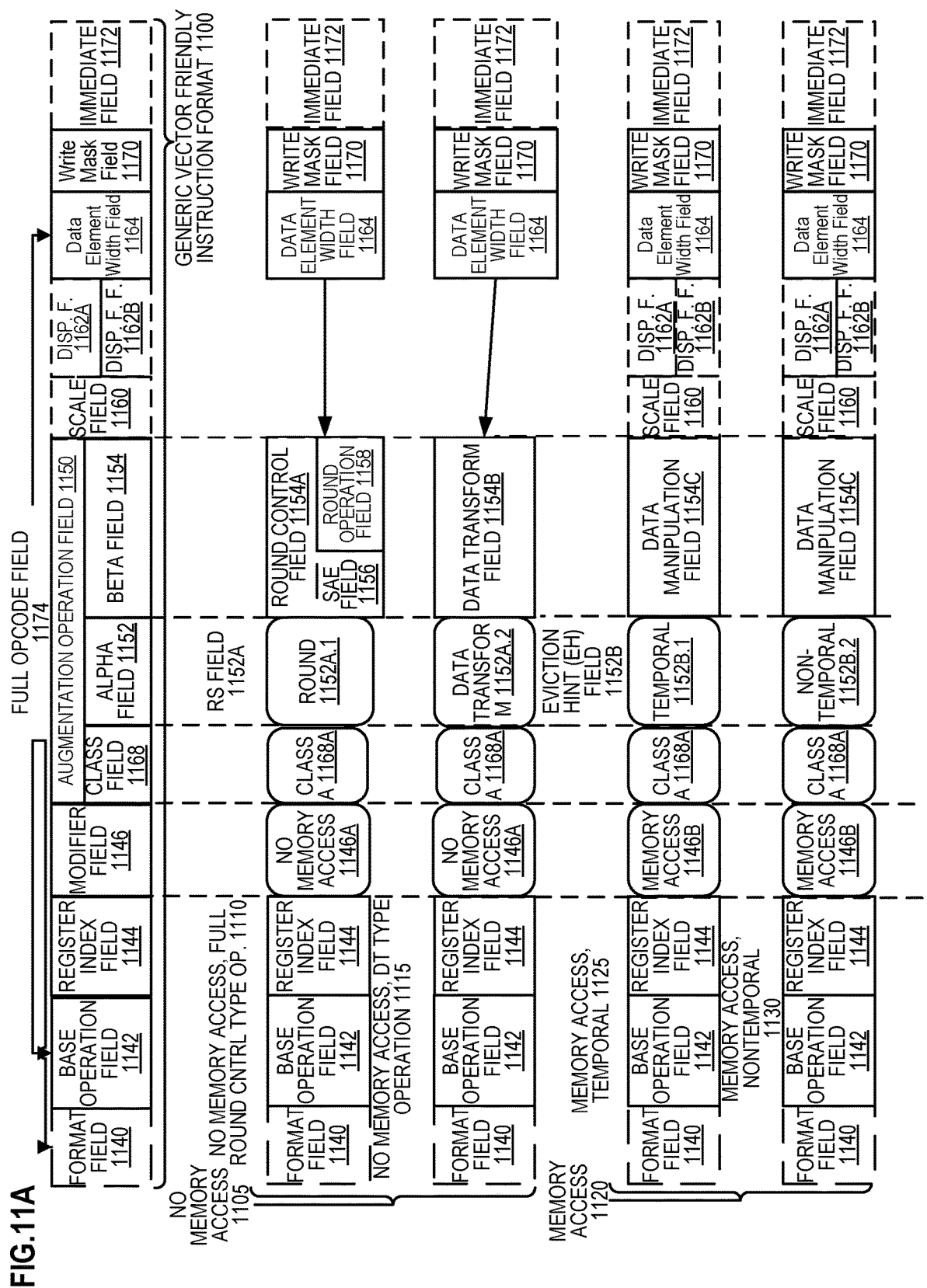
FIGS. 11A-11B are block diagrams illustrating a generic vector friendly instruction format and instruction templates thereof according to embodiments of the invention.
Figure 11B:
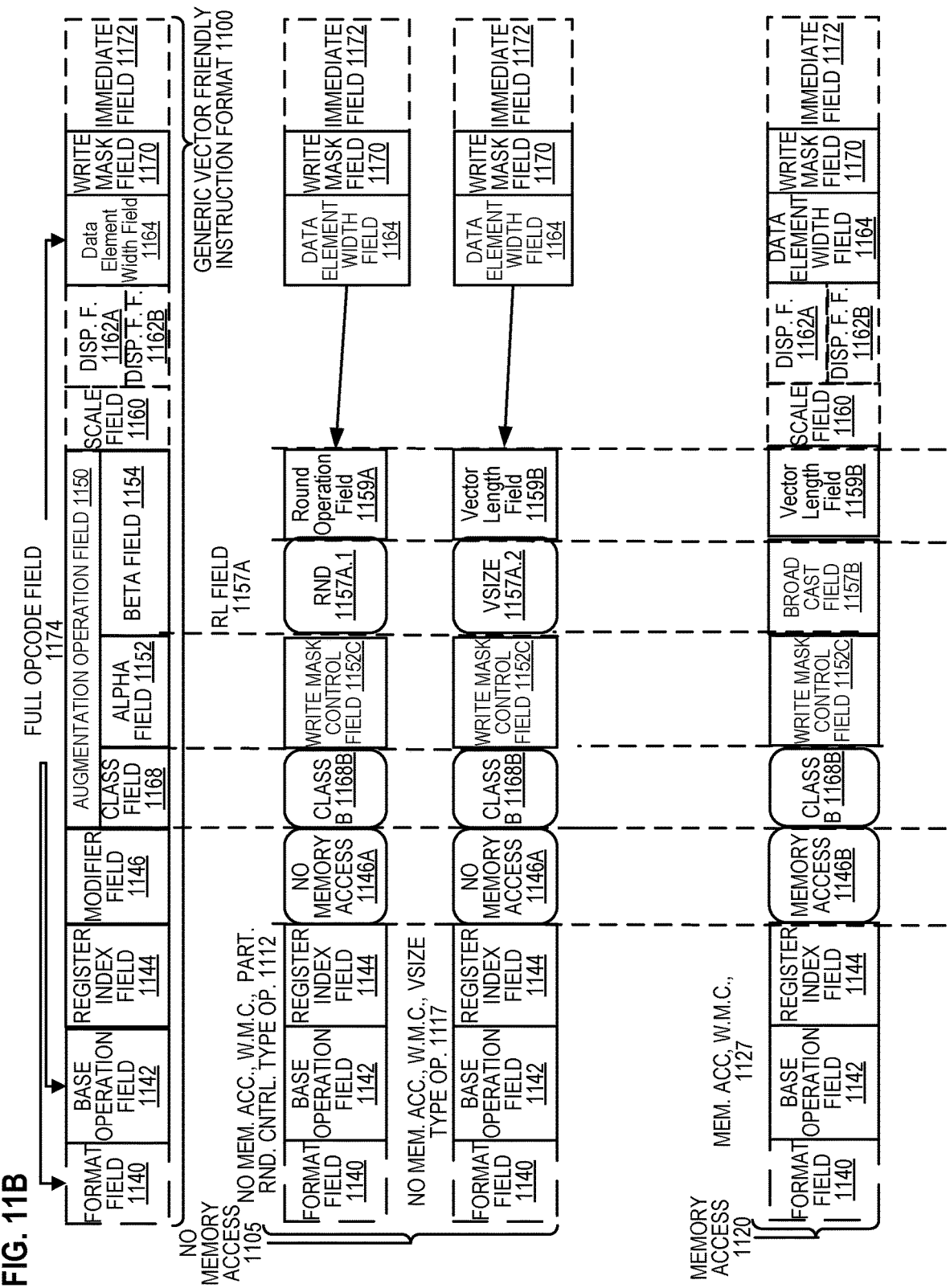

FIGS. 11A-11B are block diagrams illustrating a generic vector friendly instruction format and instruction templates thereof according to embodiments of the invention. FIG. 11A is a block diagram illustrating a generic vector friendly instruction format and class A instruction templates thereof according to embodiments of the invention; while FIG. 11B is a block diagram illustrating the generic vector friendly instruction format and class B instruction templates thereof according to embodiments of the invention. Specifically, a generic vector friendly instruction format 1100 for which are defined class A and class B instruction templates, both of which include no memory access 1105 instruction templates and memory access 1120 instruction templates. The term generic in the context of the vector friendly instruction format refers to the instruction format not being tied to any specific instruction set.

While embodiments of the invention will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

The class A instruction templates in FIG. 11A include: 1) within the no memory access 1105 instruction templates there is shown a no memory access, full round control type operation 1110 instruction template and a no memory access, data transform type operation 1115 instruction template; and 2) within the memory access 1120 instruction templates there is shown a memory access, temporal 1125 instruction template and a memory access, non-temporal 1130 instruction template. The class B instruction templates in FIG. 11B include: 1) within the no memory access 1105 instruction templates there is shown a no memory access, write mask control, partial round control type operation 1112 instruction template and a no memory access, write mask control, vsize type operation 1117 instruction template; and 2) within the memory access 1120 instruction templates there is shown a memory access, write mask control 1127 instruction template.

The generic vector friendly instruction format 1100 includes the following fields listed below in the order illustrated in FIGS. 11A-11B.

Format field 1140—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 1142—its content distinguishes different base operations.

Register index field 1144—its content, directly or through address generation, specifies the locations of the source and destination operands, be they in registers or in memory. These include a sufficient number of bits to select N registers from a P×Q (e.g. 32×512, 16×128, 32×1024, 64×1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 1146—its content distinguishes occurrences of instructions in the generic vector instruction format that specify memory access from those that do not; that is, between no memory access 1105 instruction templates and memory access 1120 instruction templates. Memory access operations read and/or write to the memory hierarchy (in some cases specifying the source and/or destination identifiers using values in registers), while non-memory access operations do not (e.g., the source and destinations are registers). While in one embodiment this field also selects between three different ways to perform memory address calculations, alternative embodiments may support more, less, or different ways to perform memory address calculations.

Augmentation operation field 1150—its content distinguishes which one of a variety of different operations to be performed in addition to the base operation. This field is context specific. In one embodiment of the invention, this field is divided into a class field 1168, an alpha field 1152, and a beta field 1154. The augmentation operation field 1150 allows common groups of operations to be performed in a single instruction rather than 2, 3, or 4 instructions.

Scale field 1160—its content allows for the scaling of the index field's content for memory address generation (e.g., for address generation that uses $2^{scale}*index+base$).

Displacement Field 1162A—its content is used as part of memory address generation (e.g., for address generation that uses $2^{scale}*index+base+displacement$).

Displacement Factor Field 1162B (note that the juxtaposition of displacement field 1162A directly over displacement factor field 1162B indicates one or the other is used)—its content is used as part of address generation; it specifies a displacement factor that is to be scaled by the size of a memory access (N)—where N is the number of bytes in the memory access (e.g., for address generation that uses 2scale*index+base+scaled displacement). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 1174 (described later herein) and the data manipulation field 1154C. The displacement field 1162A and the displacement factor field 1162B are optional in the sense that they are not used for the no memory access 1105 instruction templates and/or different embodiments may implement only one or none of the two.

Data element width field 1164—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 1170—its content controls, on a per data element position basis, whether that data element position in the destination vector operand reflects the result of the base operation and augmentation operation. Class A instruction templates support merging-write masking, while class B instruction templates support both merging- and zeroing-write masking. When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 1170 allows for partial vector operations, including loads, stores, arithmetic, logical, etc. While embodiments of the invention are described in which the write mask field's 1170 content selects one of a number of write mask registers that contains the write mask to be used (and thus the write mask field's 1170 content indirectly identifies that masking to be performed), alternative embodiments instead or additional allow the mask write field's 1170 content to directly specify the masking to be performed.

Immediate field 1172—its content allows for the specification of an immediate. This field is optional in the sense that is it not present in an implementation of the generic vector friendly format that does not support immediate and it is not present in instructions that do not use an immediate.

Class field 1168—its content distinguishes between different classes of instructions. With reference to FIGS. 11A-11B, the contents of this field select between class A and class B instructions. In FIGS. 11A-11B, rounded corner squares are used to indicate a specific value is present in a field (e.g., class A 1168A and class B 1168B for the class field 1168 respectively in FIGS. 11A-11B).

Instruction Templates of Class A

In the case of the non-memory access 1105 instruction templates of class A, the alpha field 1152 is interpreted as an RS field 1152A, whose content distinguishes which one of the different augmentation operation types are to be performed (e.g., round 1152A.1 and data transform 1152A.2 are respectively specified for the no memory access, round type operation 1110 and the no memory access, data transform type operation 1115 instruction templates), while the beta field 1154 distinguishes which of the operations of the specified type is to be performed. In the no memory access 1105 instruction templates, the scale field 1160, the displacement field 1162A, and the displacement scale field 1162B are not present.

No-Memory Access Instruction Templates—Full Round Control Type Operation

In the no memory access, full round control type operation 1110 instruction template, the beta field 1154 is interpreted as a round control field 1154A, whose content(s) provide static rounding. While in the described embodiments of the invention the round control field 1154A includes a suppress all floating point exceptions (SAE) field 1156 and a round operation control field 1158, alternative embodiments may support may encode both these concepts into the same field or only have one or the other of these concepts/fields (e.g., may have only the round operation control field 1158).

SAE field 1156—its content distinguishes whether or not to disable the exception event reporting; when the SAE field's 1156 content indicates, suppression is enabled, a given instruction does not report any kind of floating-point exception flag and does not raise any floating point exception handler.

Round operation control field 1158—its content distinguishes which one of a group of rounding operations to perform (e.g., Round-up, Round-down, Round-towards-zero and Round-to-nearest). to-nearest). Thus, the round operation control field 1158 allows for the changing of the rounding mode on a per instruction basis. In one embodiment of the invention where a processor includes a control register for specifying rounding modes, the round operation control field's 1158 content overrides that register value.

No Memory Access Instruction Templates—Data Transform Type Operation

In the no memory access data transform type operation 1115 instruction template, the beta field 1154 is interpreted as a data transform field 1154B, whose content distinguishes which one of a number of data transforms is to be performed (e.g., no data transform, swizzle, broadcast).

In the case of a memory access 1120 instruction template of class A, the alpha field 1152 is interpreted as an eviction hint field 1152B, whose content distinguishes which one of the eviction hints is to be used (in FIG. 11A, temporal 1152B.1 and non-temporal 1152B.2 are respectively specified for the memory access, temporal 1125 instruction template and the memory access, non-temporal 1130 instruction template), while the beta field 1154 is interpreted as a data manipulation field 1154C, whose content distinguishes which one of a number of data manipulation operations (also known as primitives) is to be performed (e.g., no manipulation; broadcast; up conversion of a source; and down conversion of a destination). The memory access 1120 instruction templates include the scale field 1160, and optionally the displacement field 1162A or the displacement scale field 1162B.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 1152 is interpreted as a write mask control (Z) field 1152C, whose content distinguishes whether the write masking controlled by the write mask field 1170 should be a merging or a zeroing.

In the case of the non-memory access 1105 instruction templates of class B, part of the beta field 1154 is interpreted as an RL field 1157A, whose content distinguishes which one of the different augmentation operation types are to be performed (e.g., round 1157A.1 and vector length (VSIZE) 1157A.2 are respectively specified for the no memory access, write mask control, partial round control type operation 1112 instruction template and the no memory access, write mask control, VSIZE type operation 1117 instruction template), while the rest of the beta field 1154 distinguishes which of the operations of the specified type is to be performed. In the no memory access 1105 instruction templates, the scale field 1160, the displacement field 1162A, and the displacement scale field 1162B are not present.

In the no memory access, write mask control, partial round control type operation 1110 instruction template, the rest of the beta field 1154 is interpreted as a round operation field 1159A and exception event reporting is disabled (a given instruction does not report any kind of floating-point exception flag and does not raise any floating point exception handler).

Round operation control field 1159A—just as round operation control field 1158, its content distinguishes which one of a group of rounding operations to perform (e.g., Round-up, Round-down, Round-towards-zero and Round-to-nearest). Thus, the round operation control field 1159A allows for the changing of the rounding mode on a per instruction basis. In one embodiment of the invention where a processor includes a control register for specifying rounding modes, the round operation control field's 1150 content overrides that register value.

In the no memory access, write mask control, VSIZE type operation 1117 instruction template, the rest of the beta field 1154 is interpreted as a vector length field 1159B, whose content distinguishes which one of a number of data vector lengths is to be performed on (e.g., 128, 256, or 512 byte).

In the case of a memory access 1120 instruction template of class B, part of the beta field 1154 is interpreted as a broadcast field 1157B, whose content distinguishes whether or not the broadcast type data manipulation operation is to be performed, while the rest of the beta field 1154 is interpreted the vector length field 1159B. The memory access 1120 instruction templates include the scale field 1160, and optionally the displacement field 1162A or the displacement scale field 1162B.

With regard to the generic vector friendly instruction format 1100, a full opcode field 1174 is shown including the format field 1140, the base operation field 1142, and the data element width field 1164. While one embodiment is shown where the full opcode field 1174 includes all of these fields, the full opcode field 1174 includes less than all of these fields in embodiments that do not support all of them. The full opcode field 1174 provides the operation code (opcode).

The augmentation operation field 1150, the data element width field 1164, and the write mask field 1170 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments of the invention, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the invention). Also, a single processor may include multiple cores, all of which support the same class or in which different cores support different class. For instance, in a processor with separate graphics and general purpose cores, one of the graphics cores intended primarily for graphics and/or scientific computing may support only class A, while one or more of the general purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implement in the other class in different embodiments of the invention. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

Exemplary Specific Vector Friendly Instruction Format

FIG. 12A is a block diagram illustrating an exemplary specific vector friendly instruction format according to embodiments of the invention. FIG. 12A shows a specific vector friendly instruction format 1200 that is specific in the sense that it specifies the location, size, interpretation, and order of the fields, as well as values for some of those fields.

The specific vector friendly instruction format 1200 may be used to extend the x86 instruction set, and thus some of the fields are similar or the same as those used in the existing x86 instruction set and extension thereof (e.g., AVX). This format remains consistent with the prefix encoding field, real opcode byte field, MOD RIM field, SIB field, displacement field, and immediate fields of the existing x86 instruction set with extensions. The fields from FIG. 11 into which the fields from FIG. 12A map are illustrated.

It should be understood that, although embodiments of the invention are described with reference to the specific vector friendly instruction format 1200 in the context of the generic vector friendly instruction format 1100 for illustrative purposes, the invention is not limited to the specific vector friendly instruction format 1200 except where claimed. For example, the generic vector friendly instruction format 1100 contemplates a variety of possible sizes for the various fields, while the specific vector friendly instruction format 1200 is shown as having fields of specific sizes. By way of specific example, while the data element width field 1164 is illustrated as a one bit field in the specific vector friendly instruction format 1200, the invention is not so limited (that is, the generic vector friendly instruction format 1100 contemplates other sizes of the data element width field 1164).

The generic vector friendly instruction format 1100 includes the following fields listed below in the order illustrated in FIG. 12A.

EVEX Prefix (Bytes 0-3) 1202—is encoded in a four-byte form.

Format Field 1140 (EVEX Byte 0, bits [7:0])—the first byte (EVEX Byte 0) is the format field 1140 and it contains 0×62 (the unique value used for distinguishing the vector friendly instruction format in one embodiment of the invention).

The second-fourth bytes (EVEX Bytes 1-3) include a number of bit fields providing specific capability.

REX field 1205 (EVEX Byte 1, bits [7-5])—consists of a EVEX.R bit field (EVEX Byte 1, bit [7]-R), EVEX.X bit field (EVEX byte 1, bit [6]-X), and 657BEX byte 1, bit [5]-B). The EVEX.R, EVEX.X, and EVEX.B bit fields provide the same functionality as the corresponding VEX bit fields, and are encoded using 1 s complement form, i.e. ZMM0 is encoded as 1111B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' field 1210—this is the first part of the REX' field 1210 and is the EVEX.R' bit field (EVEX Byte 1, bit [4]-R') that is used to encode either the upper 16 or lower 16 of the extended 32 register set. In one embodiment of the invention, this bit, along with others as indicated below, is stored in bit inverted format to distinguish (in the well-known x86 32-bit mode) from the BOUND instruction, whose real opcode byte is 62, but does not accept in the MOD R/M field (described below) the value of 11 in the MOD field; alternative embodiments of the invention do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 1215 (EVEX byte 1, bits [3:0]—mmmm)—its content encodes an implied leading opcode byte (0F, 0F 38, or 0F 3).

Data element width field 1164 (EVEX byte 2, bit [7]-W)—is represented by the notation EVEX.W. EVEX.W is used to define the granularity (size) of the datatype (either 32-bit data elements or 64-bit data elements).

EVEX.vvvv 1220 (EVEX Byte 2, bits [6:3]-vvvv)- the role of EVEX.vvvv may include the following: 1) EVEX.vvvv encodes the first source register operand, specified in inverted (1 s complement) form and is valid for instructions with 2 or more source vectors; 2) EVEX.vvvv encodes the destination register operand, specified in 1s complement form for certain vector shifts; or 3) EVEX.vvvv does not encode any operand, the field is reserved and should contain 1111b. Thus, EVEX.vvvv field 1220 encodes the 4 low-order bits of the first source register specifier stored in inverted (1 s complement) form. Depending on the instruction, an extra different EVEX bit field is used to extend the specifier size to 32 registers.

EVEX.U 1168 Class field (EVEX byte 2, bit [2]-U)—If EVEX.U=0, it indicates class A or EVEX.U0; if EVEX.U=1, it indicates class B or EVEX.U1.

Prefix encoding field 1225 (EVEX byte 2, bits [1:0]-pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one embodiment, to support legacy SSE instructions that use a SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's PLA (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2 bit SIMD prefix encodings, and thus not require the expansion.

Alpha field 1152 (EVEX byte 3, bit [7]—EH; also, known as EVEX.EH, EVEX.rs, EVEX.RL, EVEX.write mask control, and EVEX.N; also, illustrated with α)—as previously described, this field is context specific.

Beta field 1154 (EVEX byte 3, bits [6:4]-SSS, also known as EVEX.$s_{2-0}$, EVEX.$r_{2-0}$, EVEX.rr1, EVEX.LL0, EVEX.LLB; also, illustrated with βββ)—as previously described, this field is context specific.

REX' field 1210—this is the remainder of the REX' field and is the EVEX.V' bit field (EVEX Byte 3, bit [3]-V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 1170 (EVEX byte 3, bits [2:0]-kkk)—its content specifies the index of a register in the write mask registers as previously described. In one embodiment of the invention, the specific value EVEX.kkk=000 has a special behavior implying no write mask is used for the particular instruction (this may be implemented in a variety of ways including the use of a write mask hardwired to all ones or hardware that bypasses the masking hardware).

Real Opcode Field 1230 (Byte 4) is also known as the opcode byte. Part of the opcode is specified in this field.

MOD R/M Field 1240 (Byte 5) includes MOD field 1242, Reg field 1244, and R/M field 1246. As previously described, the MOD field's 1242 content distinguishes between memory access and non-memory access operations. The role of Reg field 1244 can be summarized to two situations: encoding either the destination register operand or a source register operand, or be treated as an opcode extension and not used to encode any instruction operand. The role of R/M field 1246 may include the following: encoding the instruction operand that references a memory address, or encoding either the destination register operand or a source register operand.

Scale, Index, Base (SIB) Byte (Byte 6)—As previously described, the scale field's 1250 content is used for memory address generation. SIB.xxx 1254 and SIB.bbb 1256—the contents of these fields have been previously referred to with regard to the register indexes Xxxx and Bbbb.

Displacement field 1162A (Bytes 7-10)—when MOD field 1242 contains 10, bytes 7-10 are the displacement field 1162A, and it works the same as the legacy 32-bit displacement (disp32) and works at byte granularity.

Displacement factor field 1162B (Byte 7)— when MOD field 1242 contains 01, byte 7 is the displacement factor field 1162B. The location of this field is that same as that of the legacy x86 instruction set 8-bit displacement (disp8), which works at byte granularity. Since disp8 is sign extended, it can only address between −128 and 127 bytes' offsets; in terms of 64 byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field 1162B is a reinterpretation of disp8; when using displacement factor field 1162B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement assumes that the effective displacement is multiple of the granularity of the memory access, and hence, the redundant low-order bits of the address offset do not need to be encoded. In other words, the displacement factor field 1162B substitutes the legacy x86 instruction set 8-bit displacement. Thus, the displacement factor field 1162B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset). Immediate field 1172 operates as previously described.

Full Opcode Field

FIG. 12B is a block diagram illustrating the fields of the specific vector friendly instruction format 1200 that make up the full opcode field 1174 according to one embodiment of the invention. Specifically, the full opcode field 1174 includes the format field 1140, the base operation field 1142, and the data element width (W) field 1164. The base operation field 1142 includes the prefix encoding field 1225, the opcode map field 1215, and the real opcode field 1230.

Register Index Field

FIG. 12C is a block diagram illustrating the fields of the specific vector friendly instruction format 700 that make up the register index field 1144 according to one embodiment of the invention. Specifically, the register index field 1144 includes the REX field 1205, the REX' field 1210, the MODR/M.reg field 1244, the MODR/M.r/m field 1246, the VVVV field 1220, xxx field 1254, and the bbb field 1256.

Augmentation Operation Field

Figure 12D:
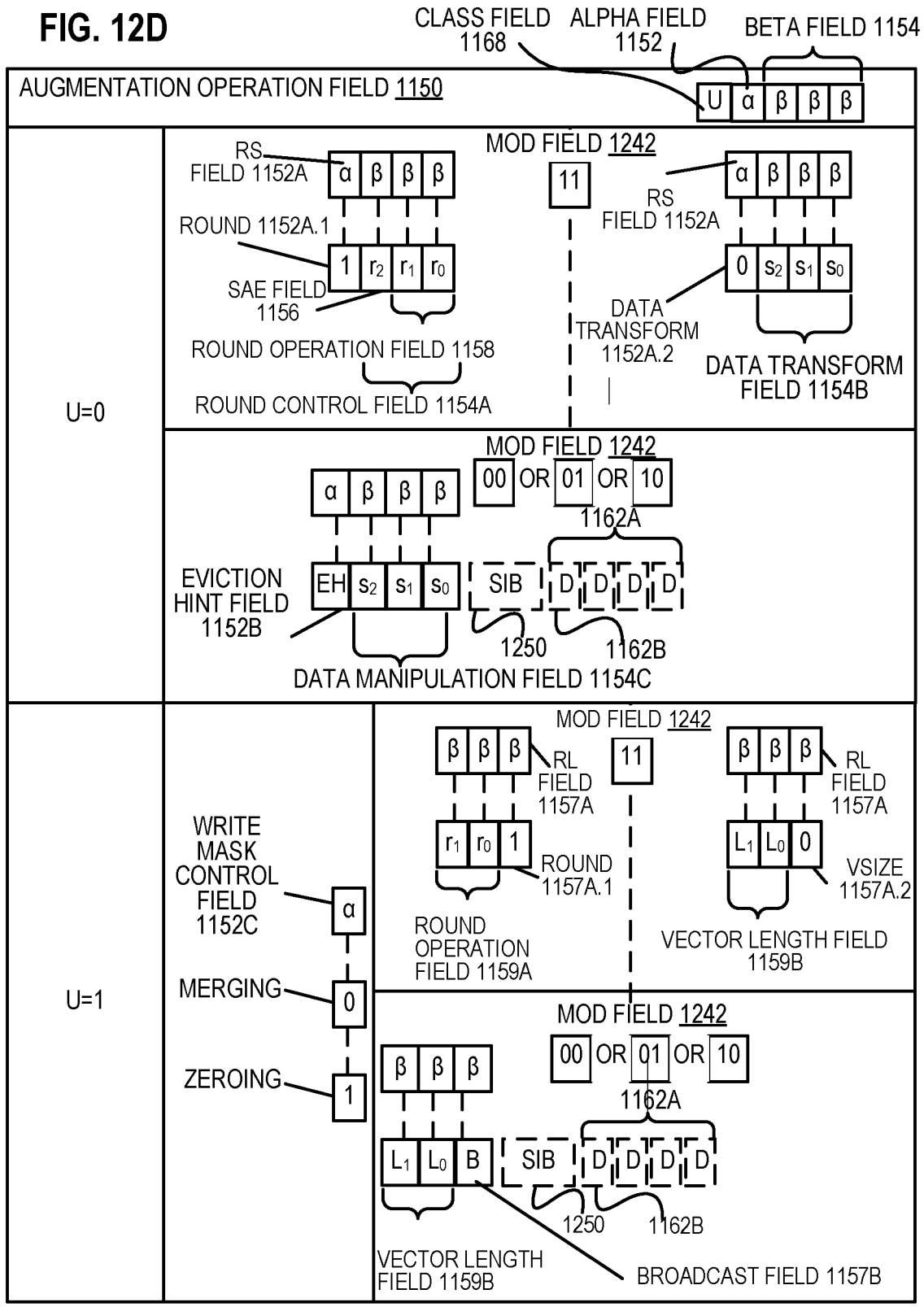
FIG. 12D is a block diagram illustrating the fields of the specific vector friendly instruction format 1200 that make up the augmentation operation field 1150 according to one embodiment of the invention.

FIG. 12D is a block diagram illustrating the fields of the specific vector friendly instruction format 1200 that make up the augmentation operation field 1150 according to one embodiment of the invention. When the class (U) field 1168 contains 0, it signifies EVEX.U0 (class A 1168A); when it contains 1, it signifies EVEX.U1 (class B 1168B). When U=0 and the MOD field 1242 contains 11 (signifying a no memory access operation), the alpha field 1152 (EVEX byte 3, bit [7]-EH) is interpreted as the rs field 1152A. When the rs field 1152A contains a 1 (round 1152A.1), the beta field 1154 (EVEX byte 3, bits [6:4]-SSS) is interpreted as the round control field 1154A. The round control field 1154A includes a one bit SAE field 1156 and a two bit round operation field 1158. When the rs field 1152A contains a 0 (data transform 1152A.2), the beta field 1154 (EVEX byte 3, bits [6:4]-SSS) is interpreted as a three bit data transform field 1154B. When U=0 and the MOD field 1242 contains 00, 01, or 10 (signifying a memory access operation), the alpha field 1152 (EVEX byte 3, bit [7]-EH) is interpreted as the eviction hint (EH) field 1152B and the beta field 1154 (EVEX byte 3, bits [6:4]-SSS) is interpreted as a three bit data manipulation field 1154C.

When U=1, the alpha field 1152 (EVEX byte 3, bit [7]-EH) is interpreted as the write mask control (Z) field 1152C. When U=1 and the MOD field 1242 contains 11 (signifying a no memory access operation), part of the beta field 1154 (EVEX byte 3, bit [4]-$S_0$) is interpreted as the RL field 1157A; when it contains a 1 (round 1157A.1) the rest of the beta field 1154 (EVEX byte 3, bit [6-5]-Sm) is interpreted as the round operation field 1159A, while when the RL field 1157A contains a 0 (VSIZE 1157.A2) the rest of the beta field 1154 (EVEX byte 3, bit [6-5]-$S_{2-1}$) is interpreted as the vector length field 1159B (EVEX byte 3, bit [6-5]-$L_{1-0}$). When U=1 and the MOD field 1242 contains 00, 01, or 10 (signifying a memory access operation), the beta field 1154 (EVEX byte 3, bits [6:4]-SSS) is interpreted as the vector length field 1159B (EVEX byte 3, bit [6-5]-$L_{1-0}$) and the broadcast field 1157B (EVEX byte 3, bit [4]-B).

Exemplary Register Architecture

Figure 13:
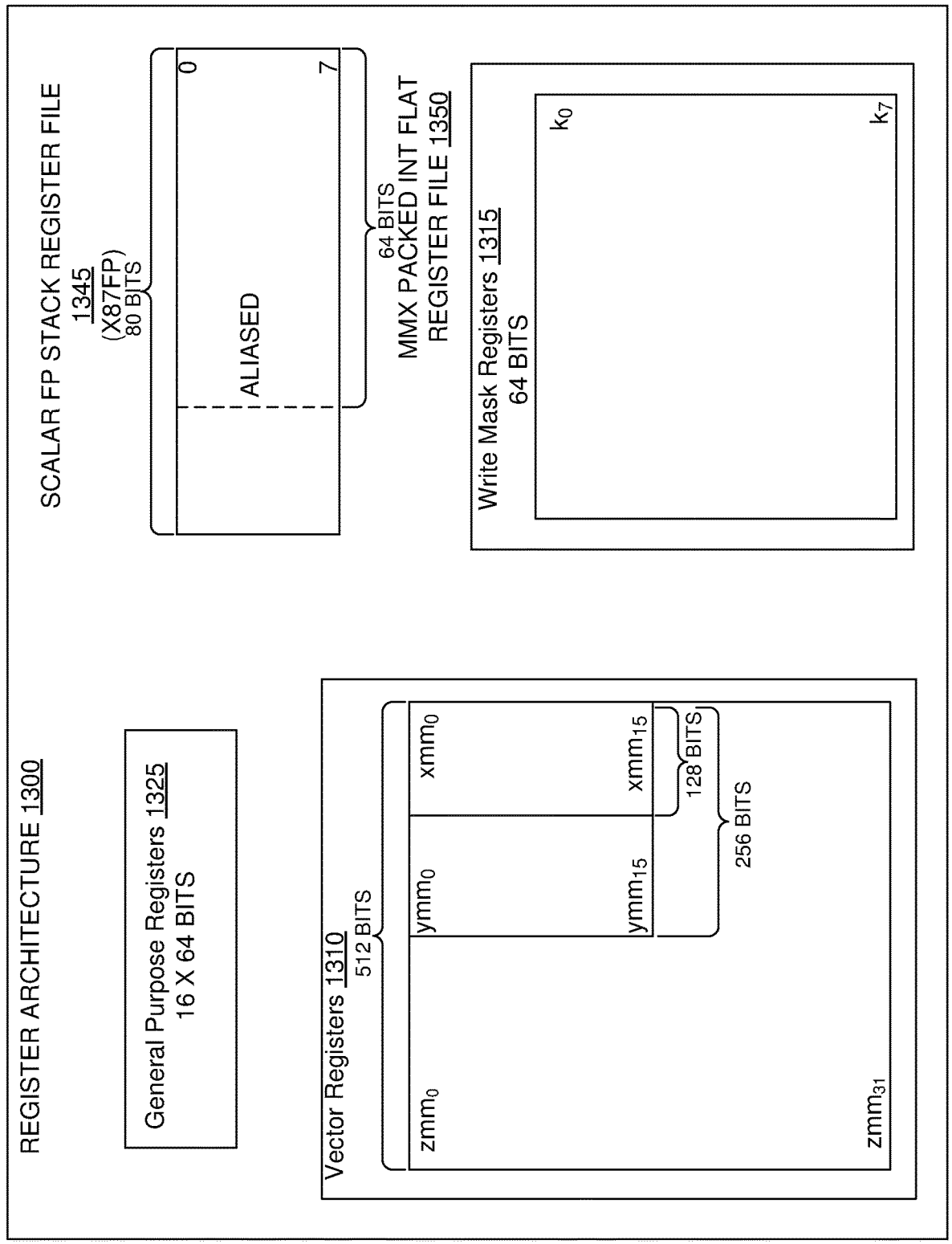
FIG. 13 is a block diagram of a register architecture 1300 according to one embodiment of the invention.

FIG. 13 is a block diagram of a register architecture 1300 according to one embodiment of the invention. In the embodiment illustrated, there are 32 vector registers 1310 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15. The specific vector friendly instruction format 1200 operates on these overlaid register file as illustrated in the below tables.

| Adjustable Vector Length | Class | Operations | Registers |
| --- | --- | --- | --- |
| Instruction Templates that do not include the vector length field 1159B | A (FIG. 11A; U = 0) | 1110, 1115, 1125, 1130 | zmm registers (the vector length is 64 byte) |
| | B (FIG. 11B; U = 1) | 1112 | zmm registers (the vector length is 64 byte) |

| Adjustable Vector Length | Class | Operations | Registers |
|---|---|---|---|
| Instruction templates that do include the vector length field 1159B | B (FIG. 11B; U = 1) | 1117, 1127 | zmm, ymm, or xmm registers (the vector length is 64 bytes, 32 bytes, or 16 bytes) depending on the vector length field 1159B |

In other words, the vector length field 1159B selects between a maximum length and one or more other shorter lengths, where each such shorter length is half the length of the preceding length; and instructions templates without the vector length field 1159B operate on the maximum vector length. Further, in one embodiment, the class B instruction templates of the specific vector friendly instruction format 1200 operate on packed or scalar single/double-precision floating point data and packed or scalar integer data. Scalar operations are operations performed on the lowest order data element position in an zmm/ymm/xmm register; the higher order data element positions are either left the same as they were prior to the instruction or zeroed depending on the embodiment.

Write mask registers 1315—in the embodiment illustrated, there are 8 write mask registers (k0 through k7), each 64 bits in size. In an alternate embodiment, the write mask registers 1315 are 16 bits in size. As previously described, in one embodiment of the invention, the vector mask register k0 cannot be used as a write mask; when the encoding that would normally indicate k0 is used for a write mask, it selects a hardwired write mask of 0xFFFF, effectively disabling write masking for that instruction.

General-purpose registers 1325—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 1345, on which is aliased the MMX packed integer flat register file 1350—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the invention may use wider or narrower registers. Additionally, alternative embodiments of the invention may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 14A is a block diagram illustrating both an exemplary in-order pipeline and an exemplary register renaming, out-of-order issue/execution pipeline according to embodiments of the invention. FIG. 14B is a block diagram illustrating both an exemplary embodiment of an in-order architecture core and an exemplary register renaming, out-of-order issue/execution architecture core to be included in a processor according to embodiments of the invention. The solid lined boxes in FIGS. 14A-14B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 14A, a processor pipeline 1400 includes a fetch stage 1402, a length decode stage 1404, a decode stage 1406, an allocation stage 1408, a renaming stage 1410, a scheduling (also known as a dispatch or issue) stage 1412, a register read/memory read stage 1414, an execute stage 1416, a write back/memory write stage 1418, an exception handling stage 1422, and a commit stage 1424.

FIG. 14B shows processor core 1490 including a front end unit 1430 coupled to an execution engine unit 1450, and both are coupled to a memory unit 1470. The core 1490 may be a reduced instruction set computing (RISC) core, a complex instruction set computing (CISC) core, a very long instruction word (VLIW) core, or a hybrid or alternative core type. As yet another option, the core 1490 may be a special-purpose core, such as, for example, a network or communication core, compression engine, coprocessor core, general purpose computing graphics processing unit (GPGPU) core, graphics core, or the like.

The front end unit 1430 includes a branch prediction unit 1432 coupled to an instruction cache unit 1434, which is coupled to an instruction translation lookaside buffer (TLB) 1436, which is coupled to an instruction fetch unit 1438, which is coupled to a decode unit 1440. The decode unit 1440 (or decoder) may decode instructions, and generate as an output one or more micro-operations, micro-code entry points, microinstructions, other instructions, or other control signals, which are decoded from, or which otherwise reflect, or are derived from, the original instructions. The decode unit 1440 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1490 includes a microcode ROM or other medium that stores microcode for certain macroinstructions (e.g., in decode unit 1440 or otherwise within the front end unit 1430). The decode unit 1440 is coupled to a rename/allocator unit 1452 in the execution engine unit 1450.

The execution engine unit 1450 includes the rename/allocator unit 1452 coupled to a retirement unit 1454 and a set of one or more scheduler unit(s) 1456. The scheduler unit(s) 1456 represents any number of different schedulers, including reservations stations, central instruction window, etc. The scheduler unit(s) 1456 is coupled to the physical register file(s) unit(s) 1458. Each of the physical register file(s) units 1458 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 1458 comprises a vector registers unit, a write mask registers unit, and a scalar registers unit. These register units may provide architectural vector registers, vector mask registers, and general purpose registers. The physical register file(s) unit(s) 1458 is overlapped by the retirement unit 1454 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 1454 and the physical register file(s) unit(s) 1458 are coupled to the execution cluster(s) 1460. The execution cluster(s) 1460 includes a set of one or more execution units 1462 and a set of one or more memory access units 1464. The execution units 1462 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1456, physical register file(s) unit(s) 1458, and execution cluster(s) 1460 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1464). It should also be understood that where separate pipelines are used, one or more of these pipelines may be out-of-order issue/execution and the rest in-order.

The set of memory access units 1464 is coupled to the memory unit 1470, which includes a data TLB unit 1472 coupled to a data cache unit 1474 coupled to a level 2 (L2) cache unit 1476. In one exemplary embodiment, the memory access units 1464 may include a load unit, a store address unit, and a store data unit, each of which is coupled to the data TLB unit 1472 in the memory unit 1470. The instruction cache unit 1434 is further coupled to a level 2 (L2) cache unit 1476 in the memory unit 1470. The L2 cache unit 1476 is coupled to one or more other levels of cache and eventually to a main memory.

By way of example, the exemplary register renaming, out-of-order issue/execution core architecture may implement the pipeline 1400 as follows: 1) the instruction fetch unit 1438 performs the fetch and length decoding stages 1402 and 1404; 2) the decode unit 1440 performs the decode stage 1406; 3) the rename/allocator unit 1452 performs the allocation stage 1408 and renaming stage 1410; 4) the scheduler unit(s) 1456 performs the schedule stage 1412; 5) the physical register file(s) unit(s) 1458 and the memory unit 1470 perform the register read/memory read stage 1414; the execution cluster 1460 perform the execute stage 1416; 6) the memory unit 1470 and the physical register file(s) unit(s) 1458 perform the write back/memory write stage 1418; 7) various units may be involved in the exception handling stage 1422; and 8) the retirement unit 1454 and the physical register file(s) unit(s) 1458 perform the commit stage 1424.

The core 1490 may support one or more instructions sets (e.g., the x86 instruction set (with some extensions that have been added with newer versions); the MIPS instruction set of MIPS Technologies of Sunnyvale, California; the ARM instruction set (with optional additional extensions such as NEON) of ARM Holdings of Sunnyvale, California), including the instruction(s) described herein. In one embodiment, the core 1490 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 1434/1474 and a shared L2 cache unit 1476, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 15B:
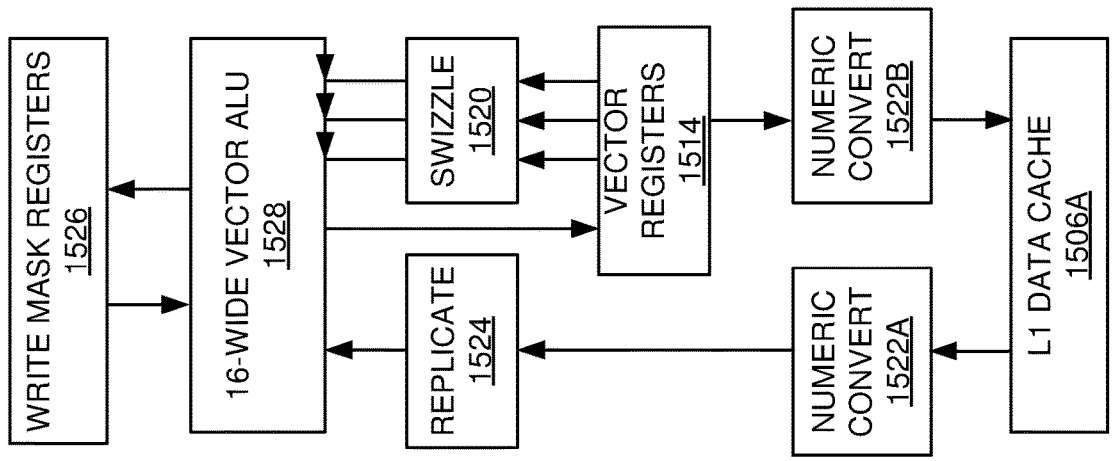
FIGS. 15A-15B illustrate a block diagram of a more specific exemplary in-order core architecture, which core would be one of several logic blocks (including other cores of the same type and/or different types) in a chip.
Figure 15A:
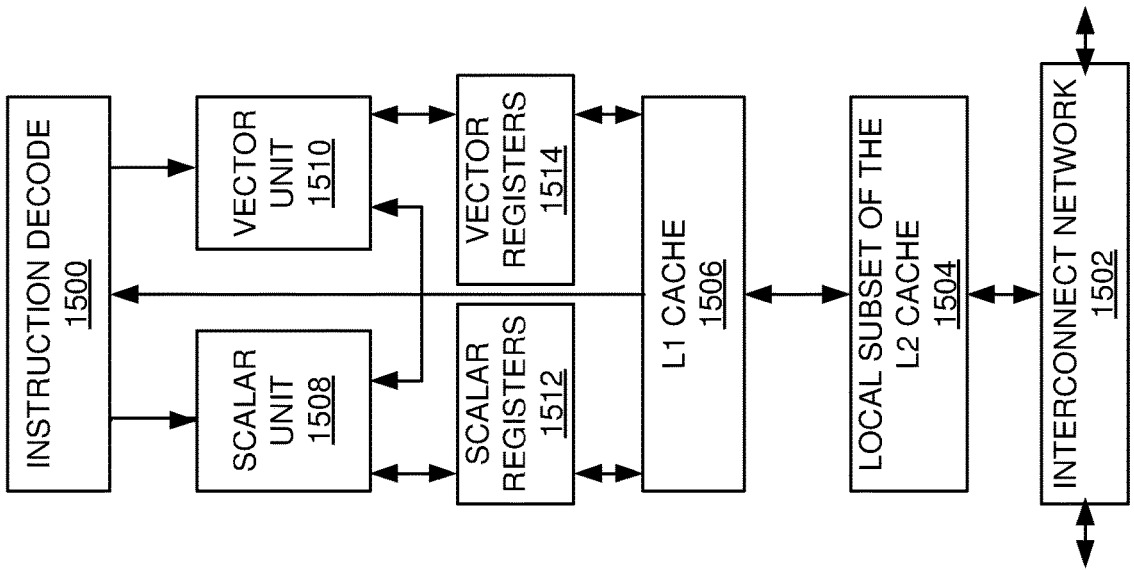

FIGS. 15A-15B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 15A is a block diagram of a single processor core, along with its connection to the on-die interconnect network 1502 and with its local subset of the Level 2 (L2) cache

1504, according to embodiments of the invention. In one embodiment, an instruction decoder 1500 supports the x86 instruction set with a packed data instruction set extension. An L1 cache 1506 allows low-latency accesses to cache memory into the scalar and vector units. While in one embodiment (to simplify the design), a scalar unit 1508 and a vector unit 1510 use separate register sets (respectively, scalar registers 1512 and vector registers 1514) and data transferred between them is written to memory and then read back in from a level 1 (L1) cache 1506, alternative embodiments of the invention may use a different approach (e.g., use a single register set or include a communication path that allow data to be transferred between the two register files without being written and read back).

The local subset of the L2 cache 1504 is part of a global L2 cache that is divided into separate local subsets, one per processor core. Each processor core has a direct access path to its own local subset of the L2 cache 1504. Data read by a processor core is stored in its L2 cache subset 1504 and can be accessed quickly, in parallel with other processor cores accessing their own local L2 cache subsets. Data written by a processor core is stored in its own L2 cache subset 1504 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 15B is an expanded view of part of the processor core in FIG. 15A according to embodiments of the invention. FIG. 15B includes an L1 data cache 1506A part of the L1 cache 1504, as well as more detail regarding the vector unit 1510 and the vector registers 1514. Specifically, the vector unit 1510 is a 16-wide vector processing unit (VPU) (see the 16-wide ALU 1528), which executes one or more of integer, single-precision float, and double-precision float instructions. The VPU supports swizzling the register inputs with swizzle unit 1520, numeric conversion with numeric convert units 1522A-B, and replication with replication unit 1524 on the memory input. Write mask registers 1526 allow predicating resulting vector writes.

Figure 16:
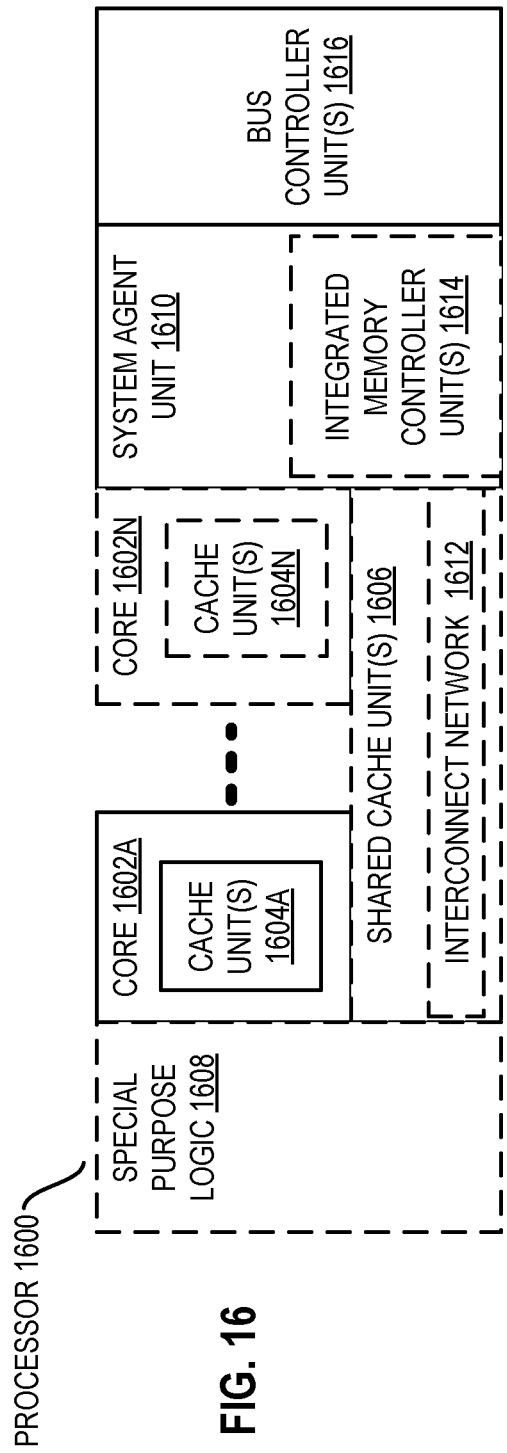
FIG. 16 is a block diagram of a processor 1600 that may have more than one core, may have an integrated memory controller, and may have integrated graphics according to embodiments of the invention.

FIG. 16 is a block diagram of a processor 1600 that may have more than one core, may have an integrated memory controller, and may have integrated graphics according to embodiments of the invention. The solid lined boxes in FIG. 16 illustrate a processor 1600 with a single core 1602A, a system agent 1610, a set of one or more bus controller units 1616, while the optional addition of the dashed lined boxes illustrates an alternative processor 1600 with multiple cores 1602A-N, a set of one or more integrated memory controller unit(s) 1614 in the system agent unit 1610, and special purpose logic 1608.

Thus, different implementations of the processor 1600 may include: 1) a CPU with the special purpose logic 1608 being integrated graphics and/or scientific (throughput) logic (which may include one or more cores), and the cores 1602A-N being one or more general purpose cores (e.g., general purpose in-order cores, general purpose out-of-order cores, a combination of the two); 2) a coprocessor with the cores 1602A-N being a large number of special purpose cores intended primarily for graphics and/or scientific (throughput); and 3) a coprocessor with the cores 1602A-N being a large number of general purpose in-order cores. Thus, the processor 1600 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1600 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1606, and external memory (not shown) coupled to the set of integrated memory controller units 1614. The set of shared cache units 1606 may include one or more mid-level caches, such as level 2 (L2), level 3 (L3), level 4 (L4), or other levels of cache, a last level cache (LLC), and/or combinations thereof. While in one embodiment a ring based interconnect unit 1612 interconnects the integrated graphics logic 1608 (integrated graphics logic 1608 is an example of and is also referred to herein as special purpose logic), the set of shared cache units 1606, and the system agent unit 1610/integrated memory controller unit(s) 1614, alternative embodiments may use any number of well-known techniques for interconnecting such units. In one embodiment, coherency is maintained between one or more cache units 1606 and cores 1602-A-N.

In some embodiments, one or more of the cores 1602A-N are capable of multi-threading. The system agent 1610 includes those components coordinating and operating cores 1602A-N. The system agent unit 1610 may include for example a power control unit (PCU) and a display unit. The PCU may be or include logic and components needed for regulating the power state of the cores 1602A-N and the integrated graphics logic 1608. The display unit is for driving one or more externally connected displays.

The cores 1602A-N may be homogenous or heterogeneous in terms of architecture instruction set; that is, two or more of the cores 1602A-N may be capable of execution the same instruction set, while others may be capable of executing only a subset of that instruction set or a different instruction set.

Exemplary Computer Architectures

FIGS. 17-20 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 17:
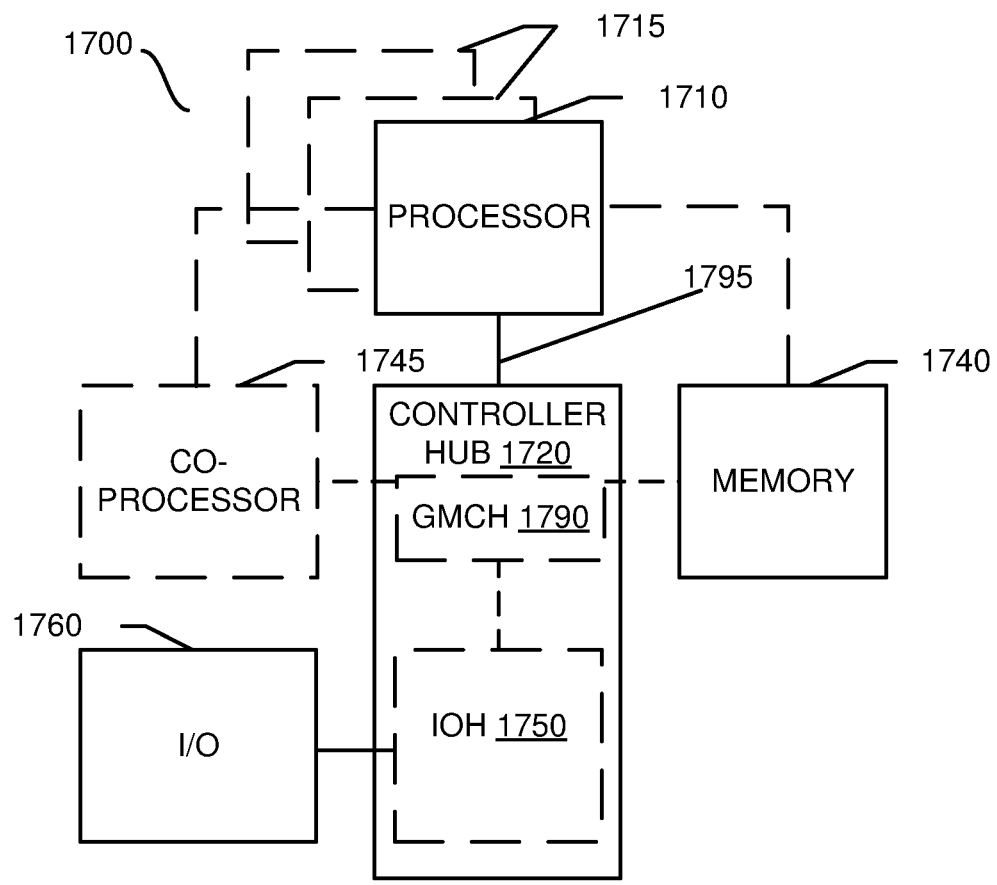

Referring now to FIG. 17, shown is a block diagram of a system 1700 in accordance with one embodiment of the present invention. The system 1700 may include one or more processors 1710, 1715, which are coupled to a controller hub 1720. In one embodiment, the controller hub 1720 includes a graphics memory controller hub (GMCH) 1790 and an Input/Output Hub (IOH) 1750 (which may be on separate chips); the GMCH 1790 includes memory and graphics controllers to which are coupled memory 1740 and a coprocessor 1745; the IOH 1750 couples input/output (I/O) devices 1760 to the GMCH 1790. Alternatively, one or both of the memory and graphics controllers are integrated within the processor (as described herein), the memory 1740 and the coprocessor 1745 are coupled directly to the processor 1710, and the controller hub 1720 in a single chip with the IOH 1750.

The optional nature of additional processors 1715 is denoted in FIG. 17 with broken lines. Each processor 1710, 1715 may include one or more of the processing cores described herein and may be some version of the processor 1600.

The memory 1740 may be, for example, dynamic random access memory (DRAM), phase change memory (PCM), or a combination of the two. For at least one embodiment, the controller hub 1720 communicates with the processor(s) 1710, 1715 via a multi-drop bus, such as a frontside bus (FSB), point-to-point interface such as QuickPath Interconnect (QPI), or similar connection 1795.

In one embodiment, the coprocessor 1745 is a special-purpose processor, such as, for example, a high-throughput MIC processor, a network or communication processor, compression engine, graphics processor, GPGPU, embedded processor, or the like. In one embodiment, controller hub 1720 may include an integrated graphics accelerator.

There can be a variety of differences between the physical resources 1710, 1715 in terms of a spectrum of metrics of merit including architectural, microarchitectural, thermal, power consumption characteristics, and the like.

In one embodiment, the processor 1710 executes instructions that control data processing operations of a general type. Embedded within the instructions may be coprocessor instructions. The processor 1710 recognizes these coprocessor instructions as being of a type that should be executed by the attached coprocessor 1745. Accordingly, the processor 1710 issues these coprocessor instructions (or control signals representing coprocessor instructions) on a coprocessor bus or other interconnect, to coprocessor 1745. Coprocessor(s) 1745 accept and execute the received coprocessor instructions.

Figure 18:
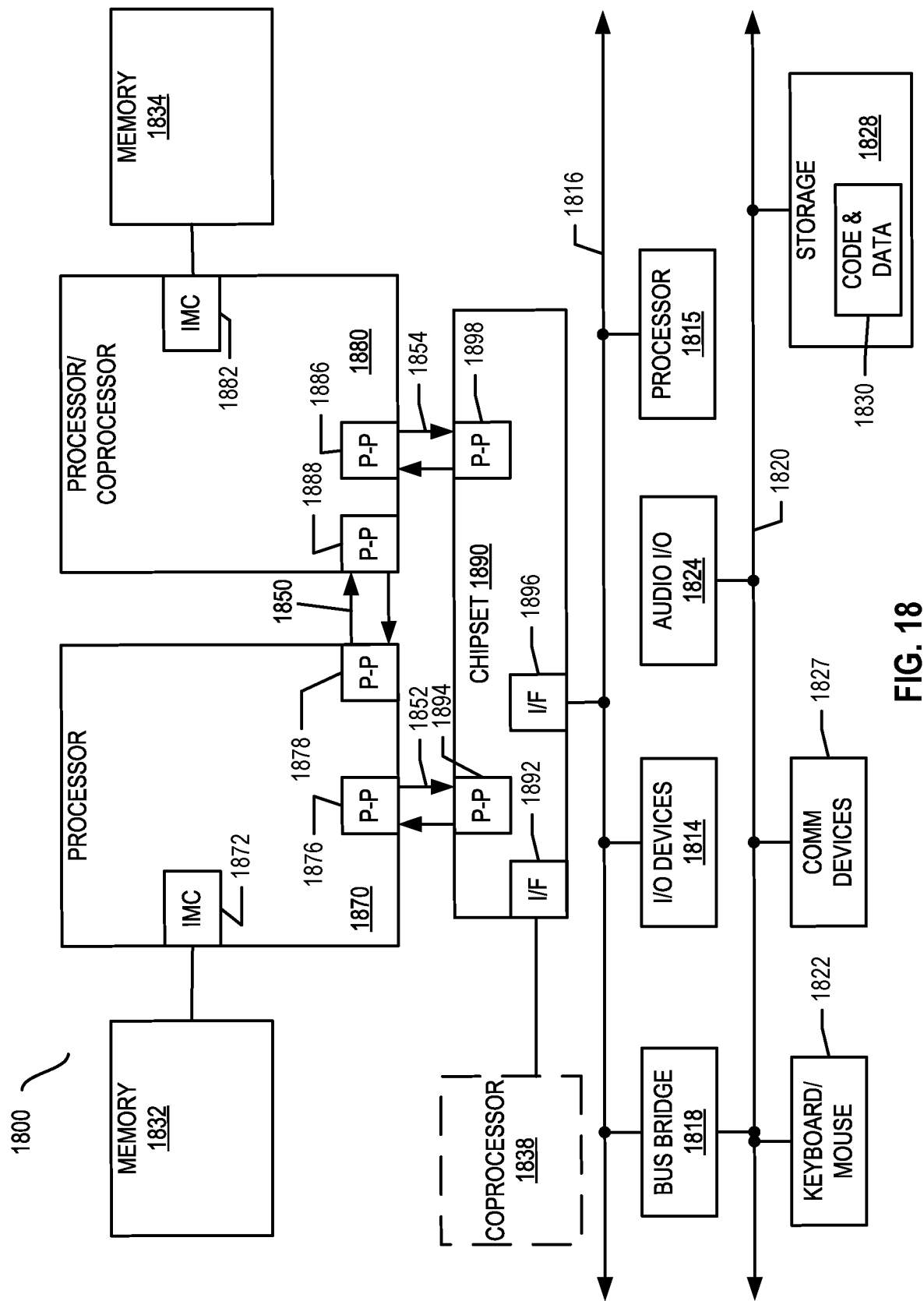

Referring now to FIG. 18, shown is a block diagram of a first more specific exemplary system 1800 in accordance with an embodiment of the present invention. As shown in FIG. 18, multiprocessor system 1800 is a point-to-point interconnect system, and includes a first processor 1870 and a second processor 1880 coupled via a point-to-point interconnect 1850. Each of processors 1870 and 1880 may be some version of the processor 1600. In one embodiment of the invention, processors 1870 and 1880 are respectively processors 1710 and 1715, while coprocessor 1838 is coprocessor 1745. In another embodiment, processors 1870 and 1880 are respectively processor 1710 coprocessor 1745.

Processors 1870 and 1880 are shown including integrated memory controller (IMC) units 1872 and 1882, respectively. Processor 1870 also includes as part of its bus controller units point-to-point (P-P) interfaces 1876 and 1878; similarly, second processor 1880 includes P-P interfaces 1886 and 1888. Processors 1870, 1880 may exchange information via a point-to-point (P-P) interface 1850 using P-P interface circuits 1878, 1888. As shown in FIG. 18, IMCs 1872 and 1882 couple the processors to respective memories, namely a memory 1832 and a memory 1834, which may be portions of main memory locally attached to the respective processors.

Processors 1870, 1880 may each exchange information with a chipset 1890 via individual P-P interfaces 1852, 1854 using point to point interface circuits 1876, 1894, 1886, 1898. Chipset 1890 may optionally exchange information with the coprocessor 1838 via a high-performance interface 1892. In one embodiment, the coprocessor 1838 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1890 may be coupled to a first bus 1816 via an interface 1896. In one embodiment, first bus 1816 may be a Peripheral Component Interconnect (PCI) bus, or a bus such as a PCI Express bus or another third generation I/O interconnect bus, although the scope of the present invention is not so limited.

As shown in FIG. 18, various I/O devices 1814 may be coupled to first bus 1816, along with a bus bridge 1818 which couples first bus 1816 to a second bus 1820. In one embodiment, one or more additional processor(s) 1815, such as coprocessors, high-throughput MIC processors, GPGPU's, accelerators (such as, e.g., graphics accelerators or digital signal processing (DSP) units), field programmable gate arrays, or any other processor, are coupled to first bus 1816. In one embodiment, second bus 1820 may be a low pin count (LPC) bus. Various devices may be coupled to a second bus 1820 including, for example, a keyboard and/or mouse 1822, communication devices 1827 and a storage unit 1828 such as a disk drive or other mass storage device which may include instructions/code and data 1830, in one embodiment. Further, an audio I/O 1824 may be coupled to the second bus 1820. Note that other architectures are possible. For example, instead of the point-to-point architecture of FIG. 18, a system may implement a multi-drop bus or other such architecture.

Figure 19:
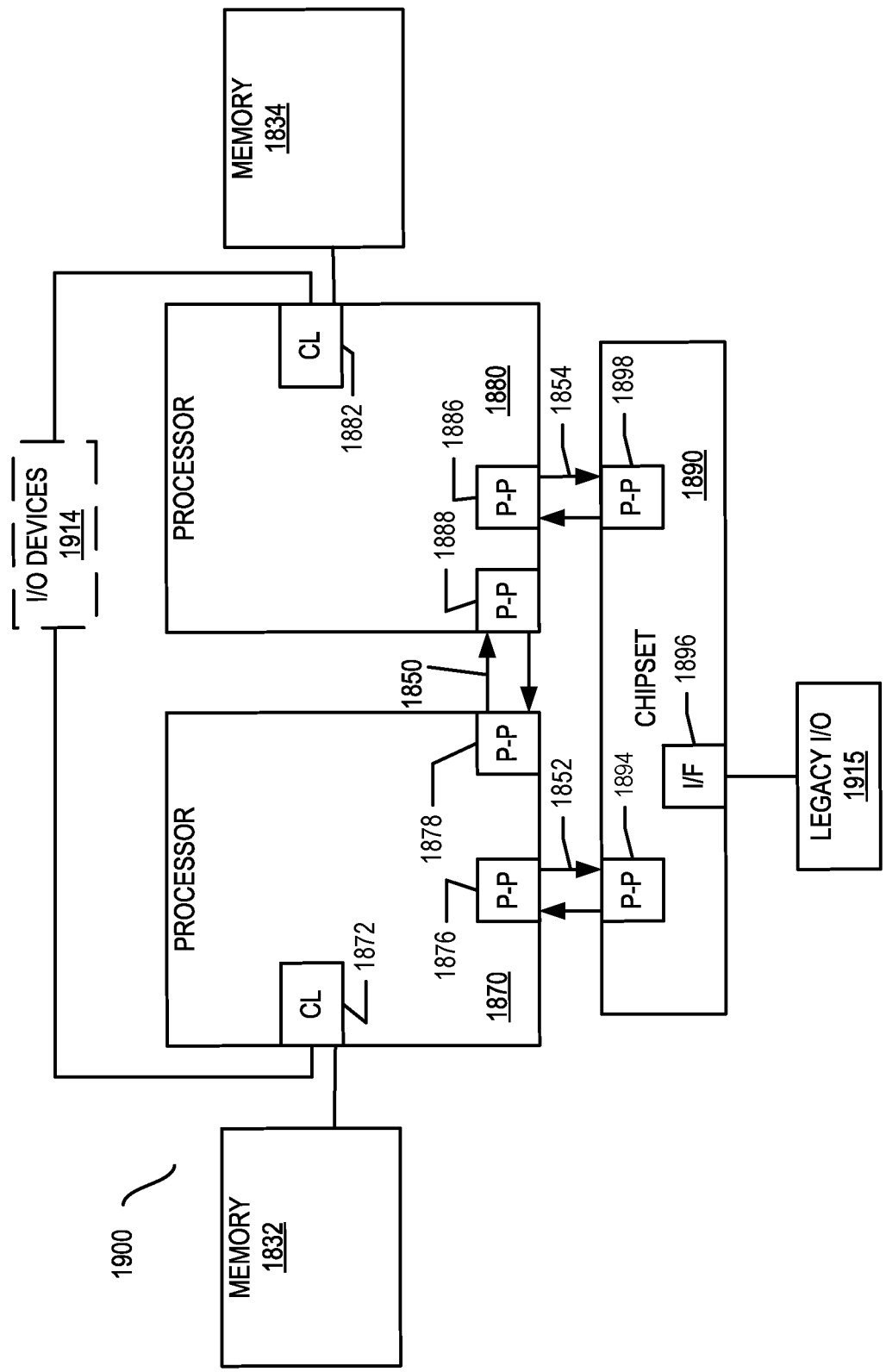

Referring now to FIG. 19, shown is a block diagram of a second more specific exemplary system 1900 in accordance with an embodiment of the present invention. Like elements in FIGS. 18 and 19 bear like reference numerals, and certain aspects of FIG. 18 have been omitted from FIG. 19 in order to avoid obscuring other aspects of FIG. 19.

FIG. 19 illustrates that the processors 1870, 1880 may include integrated memory and I/O control logic ("CL") 1872 and 1882, respectively. Thus, the CL 1872, 1882 include integrated memory controller units and include I/O control logic. FIG. 17 illustrates that not only are the memories 1832, 1834 coupled to the CL 1872, 1882, but also that I/O devices 1914 are also coupled to the control logic 1872, 1882. Legacy I/O devices 1915 are coupled to the chipset 1890.

Figure 20:
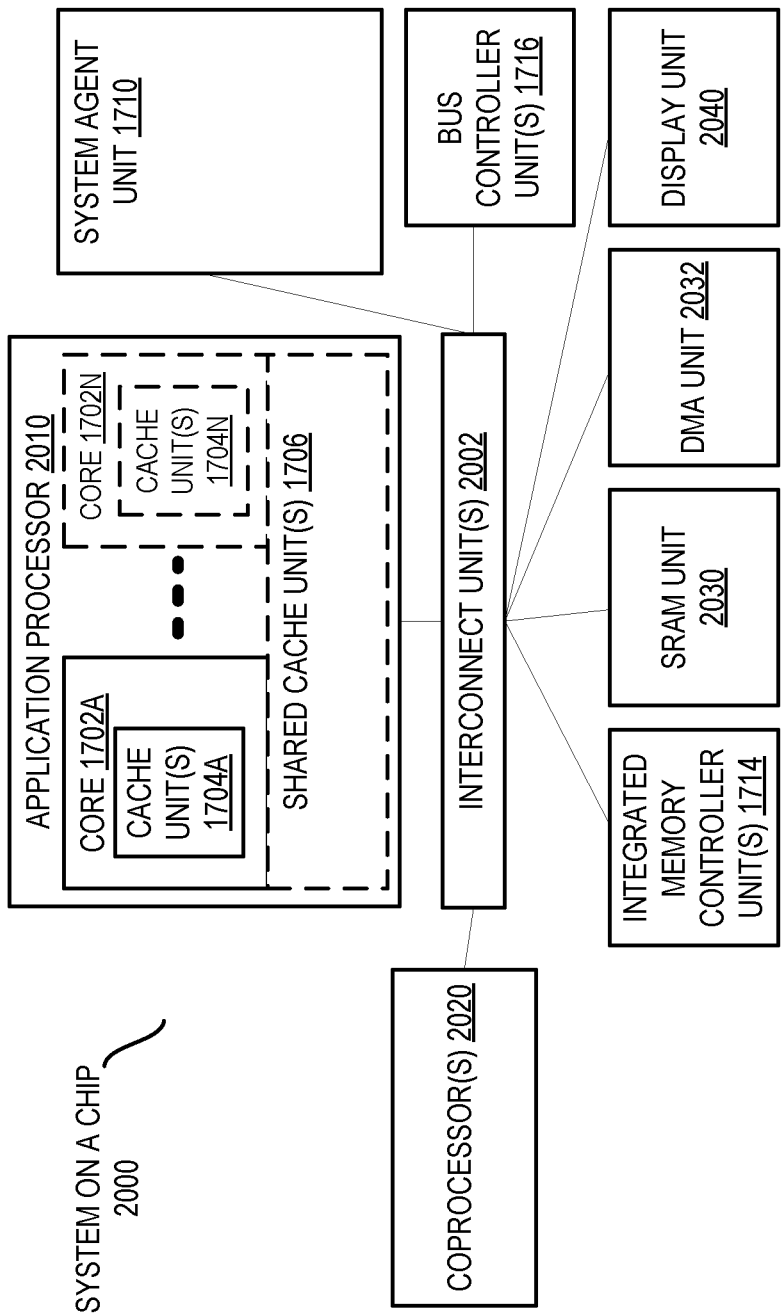

Referring now to FIG. 20, shown is a block diagram of a SoC 2000 in accordance with an embodiment of the present invention. Similar elements in FIG. 16 bear like reference numerals. Also, dashed lined boxes are optional features on more advanced SoCs. In FIG. 20, an interconnect unit(s) 2002 is coupled to: an application processor 2010 which includes a set of one or more cores 1602A-N, which include cache units 1604A-N, and shared cache unit(s) 1606; a system agent unit 1610; a bus controller unit(s) 1616; an integrated memory controller unit(s) 1614; a set or one or more coprocessors 2020 which may include integrated graphics logic, an image processor, an audio processor, and a video processor; an static random access memory (SRAM) unit 2030; a direct memory access (DMA) unit 2032; and a display unit 2040 for coupling to one or more external displays. In one embodiment, the coprocessor(s) 2020 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1830 illustrated in FIG. 18, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMS) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 21 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 21 shows a program in a high-level language 2102 may be compiled using an x86 compiler 2104 to generate x86 binary code 2106 that may be natively executed by a processor with at least one x86 instruction set core 2116. The processor with at least one x86 instruction set core 2116 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 2104 represents a compiler that is operable to generate x86 binary code 2106 (e.g., object code) that can, with or without additional linkage processing, be executed on the processor with at least one x86 instruction set core 2116. Similarly, FIG. 21 shows the program in the high level language 2102 may be compiled using an alternative instruction set compiler 2108 to generate alternative instruction set binary code 2110 that may be natively executed by a processor without at least one x86 instruction set core 2114 (e.g., a processor with cores that execute the MIPS instruction set of MIPS Technologies of Sunnyvale, CA and/or that execute the ARM instruction set of ARM Holdings of Sunnyvale, CA). The instruction converter 2112 is used to convert the x86 binary code 2106 into code that may be natively executed by the processor without an x86 instruction set core 2114. This converted code is not likely to be the same as the alternative instruction set binary code 2110 because an instruction converter capable of this is difficult to make; however, the converted code will accomplish the general operation and be made up of instructions from the alternative instruction set. Thus, the instruction converter 2112 represents software, firmware, hardware, or a combination thereof that, through emulation, simulation or any other process, allows a processor or other electronic device that does not have an x86 instruction set processor or core to execute the x86 binary code 2106.

FURTHER EXAMPLES

Example 1 provides a method for executing an instruction, the method comprising: decoding an instruction by a decode circuit, the instruction comprising an opcode, at least one memory location identifier identifying at least one data element, a register identifier, a data readiness indicator identifying at least one data access condition, and a data readiness mask; and executing the decoded instruction by an execution circuit by: for each data element of the at least one data element, determining whether a memory request for the data element satisfies the at least one data access condition identified by the data readiness indicator, and in response to determining that the memory request for the data element does not satisfy the at least one data access condition: generating a prefetch request for the data element, and setting a value in a corresponding data element position of the data readiness mask to indicate that the memory request for the data element does not satisfy the at least one data access condition.

Example 2 includes the substance of the exemplary method of Example 1, wherein execution of the decoded instruction further causes, in response to determining that the memory request for the data element does satisfy the at least one data access condition: retrieving the data element; and storing the data element in a register identified by the register identifier.

Example 3 includes the substance of the exemplary method of Example 1, wherein execution of the decoded instruction further causes the execution circuit to, in response to determining that the memory request for the data element does satisfy the at least one data access condition: retrieving the data element; storing the data element in a register identified by the register identifier; and setting a value in a corresponding data element position of the data readiness mask to indicate that the memory request for the data element does satisfy the at least one data access condition.

Example 4 includes the substance of the exemplary method of Example 1, wherein the data readiness indicator identifies a level in a memory hierarchy, and wherein the memory request for the data element satisfies the data readiness indicator when the data element is located at the identified level or at a memory hierarchy level closer to the execution circuit.

Example 5 includes the substance of the exemplary method of Example 1, wherein the data readiness indicator identifies a non-uniform memory access domain at which each data element of the at least one data element is to be located.

Example 6 includes the substance of the exemplary method of Example 1, wherein the data readiness indicator indicates that access to the data element can be accomplished without generation of a memory access miss.

Example 7 includes the substance of the exemplary method of Example 1, wherein the data readiness indicator identifies a plurality of data access conditions.

Example 8 includes the substance of the exemplary method of Example 1, wherein the memory request is part of one or more of: a scalar load operation, a scalar store operation, an aligned vector load operation, an unaligned vector load operation, an aligned vector store operation, an unaligned vector store operation, a gather operation, a scatter operation, and an atomic update to memory operation.

Example 9 provides a system for executing an instruction, the system comprising: a decode circuit to decode an instruction, the instruction comprising an opcode, at least one memory location identifier identifying at least one data element, a register identifier, a data readiness indicator identifying at least one data access condition, and a data readiness mask; and an execution circuit to execute the decoded instruction to, for each data element of the at least one data element, determine whether a memory request for the data element satisfies the at least one data access condition identified by the data readiness indicator, and in response to determining that the memory request for the data element does not satisfy the at least one data access condition: generate a prefetch request for the data element, and set a value in a corresponding data element position of the data readiness mask to indicate that the memory request for the data element does not satisfy the at least one data access condition.

Example 10 includes the substance of the exemplary system of Example 9, wherein execution of the decoded instruction further causes, in response to determining that the memory request for the data element does satisfy the at least one data access condition: retrieve the data element; and store the data element in a register identified by the register identifier.

Example 11 includes the substance of the exemplary system of Example 9, wherein execution of the decoded instruction further causes the execution circuit to, in response to determining that the memory request for the data element does satisfy the at least one data access condition: retrieve the data element; store the data element in a register identified by the register identifier; and set a value in a corresponding data element position of the data readiness mask to indicate that the memory request for the data element does satisfy the at least one data access condition.

Example 12 includes the substance of the exemplary system of Example 9, wherein the data readiness indicator identifies a level in a memory hierarchy, and wherein the memory request for the data element satisfies the data readiness indicator when the data element is located at the identified level or at a memory hierarchy level closer to the execution circuit.

Example 13 includes the substance of the exemplary system of Example 9, wherein the data readiness indicator identifies a non-uniform memory access domain at which each data element of the at least one data element is to be located.

Example 14 includes the substance of the exemplary system of Example 9, wherein the data readiness indicator indicates that access to the data element can be accomplished without generation of a memory access miss.

Example 15 includes the substance of the exemplary system of Example 9, wherein the data readiness indicator identifies a plurality of data access conditions.

Example 16 includes the substance of the exemplary system of Example 9, wherein the memory request is part of one or more of: a scalar load operation, a scalar store operation, an aligned vector load operation, an unaligned vector load operation, an aligned vector store operation, an unaligned vector store operation, a gather operation, a scatter operation, and an atomic update to memory operation.

Example 17 provides a processor for executing an instruction, the processor comprising: a decode circuit to decode an instruction, the instruction comprising an opcode, at least one memory location identifier identifying at least one data element, a register identifier, a data readiness indicator identifying at least one data access condition, and a data readiness mask; and an execution circuit to execute the decoded instruction to, for each data element of the at least one data element, determine whether a memory request for the data element satisfies the at least one data access condition identified by the data readiness indicator, and in response to determining that the memory request for the data element does not satisfy the at least one data access condition: generate a prefetch request for the data element, and set a value in a corresponding data element position of the data readiness mask to indicate that the memory request for the data element does not satisfy the at least one data access condition.

Example 18 includes the substance of the exemplary processor of Example 17, wherein execution of the decoded instruction further causes, in response to determining that the memory request for the data element does satisfy the at least one data access condition: retrieving the data element; and storing the data element in a register identified by the register identifier.

Example 19 includes the substance of the exemplary processor of Example 17, wherein execution of the decoded instruction further causes, in response to determining that the memory request for the data element does satisfy the at least one data access condition: retrieving the data element; storing the data element in a register identified by the register identifier; and setting a value in a corresponding data element position of the data readiness mask to indicate that the memory request for the data element does satisfy the at least one data access condition.

Example 20 includes the substance of the exemplary processor of Example 17, wherein the data readiness indicator identifies a level in a memory hierarchy, and wherein the memory request for the data element satisfies the data readiness indicator when the data element is located at the identified level or at a memory hierarchy level closer to the execution circuit.

Example 21 includes the substance of the exemplary processor of Example 17, wherein the data readiness indicator identifies a non-uniform memory access domain at which each data element of the at least one data element is to be located.

Example 22 includes the substance of the exemplary processor of Example 17, wherein the data readiness indicator indicates that access to the data element can be accomplished without generation of a memory access miss.

Example 23 includes the substance of the exemplary processor of Example 17, wherein the data readiness indicator identifies a plurality of data access conditions.

Example 24 includes the substance of the exemplary processor of Example 17, wherein the memory request is part of one or more of: a scalar load operation, a scalar store operation, an aligned vector load operation, an unaligned vector load operation, an aligned vector store operation, an unaligned vector store operation, a gather operation, a scatter operation, and an atomic update to memory operation.

Example 25 provides a non-transitory machine-readable medium containing instructions that, when performed by a processor, cause the performance of operations comprising: fetching an instruction from a code storage by a fetch circuit, the instruction comprising an opcode, at least one memory location identifier identifying at least one data element, a register identifier, a data readiness indicator identifying at least one data access condition, and a data readiness mask; decoding the fetched instruction by a decode circuit; and executing the decoded instruction by an execution circuit to, for each data element of the at least one data element, determine whether a memory request for the data element satisfies the at least one data access condition identified by the data readiness indicator, and in response to determining that the memory request for the data element does not satisfy the at least one data access condition: generate a prefetch request for the data element, and set a value in a corresponding data element position of the data readiness mask to indicate that the memory request for the data element does not satisfy the at least one data access condition.

Example 26 includes the substance of the exemplary non-transitory machine-readable medium of Example 25, wherein execution of the decoded instruction further causes, in response to determining that the memory request for the data element does satisfy the at least one data access condition: retrieve the data element; and store the data element in a register identified by the register identifier.

Example 27 includes the substance of the exemplary non-transitory machine-readable medium of Example 25, wherein execution of the decoded instruction further causes the execution circuit to, in response to determining that the memory request for the data element does satisfy the at least one data access condition: retrieve the data element; store the data element in a register identified by the register identifier; and set a value in a corresponding data element position of the data readiness mask to indicate that the memory request for the data element does satisfy the at least one data access condition.

Example 28 includes the substance of the exemplary non-transitory machine-readable medium of Example 25, wherein the data readiness indicator identifies a level in a memory hierarchy, and wherein the memory request for the data element satisfies the data readiness indicator when the data element is located at the identified level or at a memory hierarchy level closer to the execution circuit.

Example 29 includes the substance of the exemplary non-transitory machine-readable medium of Example 25, wherein the data readiness indicator identifies a non-uniform memory access domain at which each data element of the at least one data element is to be located.

Example 30 includes the substance of the exemplary non-transitory machine-readable medium of Example 25, wherein the data readiness indicator indicates that access to the data element can be accomplished without generation of a memory access miss.

Example 31 includes the substance of the exemplary non-transitory machine-readable medium of Example 25, wherein the data readiness indicator identifies a plurality of data access conditions.

Example 32 includes the substance of the exemplary non-transitory machine-readable medium of Example 25, wherein the memory request is part of one or more of: a scalar load operation, a scalar store operation, an aligned vector load operation, an unaligned vector load operation, an aligned vector store operation, an unaligned vector store operation, a gather operation, a scatter operation, and an atomic update to memory operation.

What is claimed is:

1. A method comprising:
  decoding a single instruction by a decode circuit, the single instruction comprising an opcode, at least one source memory location identifier, a destination register identifier, a data readiness indicator identifying at least one data access condition, and a data readiness mask; and
  executing the decoded instruction by an execution circuit by:
    for each data element of the identified source memory location,
      determining whether the data access condition for that data element is satisfied, and
      in response to determining that the data access condition for the data element is not satisfied:
        generating a prefetch request for the data element,
        setting a value in a corresponding data element position of the identified destination register, and setting a masked value in a corresponding data element position of the data readiness mask.

2. The method of claim 1, wherein execution of the decoded instruction further causes, in response to determining that the data access condition is satisfied:
retrieving the data element;
storing the data element in the identified destination register; and
setting an unmasked value in a corresponding data element position of the data readiness mask.

3. The method of claim 1, wherein the data readiness indicator identifies a level in a memory hierarchy, and wherein the memory request for the data element satisfies the data readiness indicator when the data element is located at the identified level or at a memory hierarchy level closer to the execution circuit.

4. The method of claim 1, wherein the data readiness indicator identifies a non-uniform memory access domain at which each data element of the at least one data element is to be located.

5. The method of claim 1, wherein the data readiness indicator indicates that access to the data element can be accomplished without generation of a memory access miss.

6. The method of claim 1, wherein the data readiness indicator identifies a plurality of data access conditions.

7. The method of claim 1, wherein the memory request is part of one or more of:
a scalar load operation, a scalar store operation, an aligned vector load operation, an unaligned vector load operation, an aligned vector store operation, an unaligned vector store operation, a gather operation, a scatter operation, and an atomic update to memory operation.

8. A processor for executing an instruction, the processor comprising:
a decode circuit to decode a single instruction by a decode circuit, the single instruction comprising an opcode, at least one source memory location identifier, a destination register identifier, a data readiness indicator identifying at least one data access condition, and a data readiness mask; and
an execution circuit to execute the decoded instruction to, for each data element of the identified source memory location,
determine whether the data access condition for that data element is satisfied, and in response to a determination that the data access condition for the data element is not satisfied to:
generate a prefetch request for the data element, and
set a value in a corresponding data element position of the identified destination register, and
set a masked value in a corresponding data element position of the data readiness mask.

9. The processor of claim 8, wherein execution of the decoded instruction further causes, in response to determining that the data access condition is satisfied, the execution circuitry is to:
retrieve the data element; and
store the data element in the identified destination register; and
set an unmasked value in a corresponding data element position of the data readiness mask.

10. The processor of claim 8, wherein the data readiness indicator is to identify a level in a memory hierarchy, and wherein the memory request for the data element satisfies the data readiness indicator when the data element is located at the identified level or at a memory hierarchy level closer to the execution circuit.

11. The processor of claim 8, wherein the data readiness indicator is to identify a non-uniform memory access domain at which each data element of the at least one data element is to be located.

12. The processor of claim 8, wherein the data readiness indicator is to indicate that access to the data element can be accomplished without generation of a memory access miss.

13. The processor of claim 8, wherein the data readiness indicator is to identify a plurality of data access conditions.

14. The processor of claim 8, wherein the memory request is part of one or more of: a scalar load operation, a scalar store operation, an aligned vector load operation, an unaligned vector load operation, an aligned vector store operation, an unaligned vector store operation, a gather operation, a scatter operation, and an atomic update to memory operation.

15. A non-transitory machine-readable medium containing instructions that, when performed by a processor, cause the performance of operations comprising:
fetching an instruction from a code storage by a fetch circuit, the instruction comprising an opcode, at least one source memory location identifier, a destination register identifier, a data readiness indicator identifying at least one data access condition, and a data readiness mask;
decoding the fetched instruction by a decode circuit; and
executing the decoded instruction by an execution circuit to, for each data element of the identified source memory location,
determine whether the data access condition for that data element is satisfied, and
in response to determining that the data access condition for the data element is not satisfied,
generating a prefetch request for the data element, and
setting a value in a corresponding data element position of the identified destination register, and
setting a masked value in a corresponding data element position of the data readiness mask.

16. The non-transitory machine-readable medium of claim 15, wherein execution of the decoded instruction further causes, in response to determining that the data access condition is satisfied, the execution circuitry is to:
retrieve the data element; and
store the data element in the identified destination register; and
set an unmasked value in a corresponding data element position of the data readiness mask.

17. The non-transitory machine-readable medium of claim 15, wherein the data readiness indicator is to identify a level in a memory hierarchy, and wherein the memory request for the data element satisfies the data readiness indicator when the data element is located at the identified level or at a memory hierarchy level closer to the execution circuit.

* * * * *